US011943842B2

(12) United States Patent
Gan et al.

(10) Patent No.: US 11,943,842 B2
(45) Date of Patent: *Mar. 26, 2024

(54) SECONDARY AUTHORIZATION AT PDU SESSION ESTABLISHMENT FOR HOME ROUTED ROAMING

(71) Applicant: Telefonaktiebolaget LM Ericsson (publ), Stockholm (SE)

(72) Inventors: Juying Gan, Shanghai (CN); Yunjie Lu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,803

(22) Filed: Dec. 1, 2022

(65) Prior Publication Data

US 2023/0112860 A1   Apr. 13, 2023

Related U.S. Application Data

(63) Continuation of application No. 17/147,563, filed on Jan. 13, 2021, now Pat. No. 11,546,966, which is a
(Continued)

(51) Int. Cl.
*H04W 80/10* (2009.01)
*H04W 12/06* (2021.01)
(Continued)

(52) U.S. Cl.
CPC .......... *H04W 80/10* (2013.01); *H04W 12/06* (2013.01); *H04W 76/11* (2018.02); *H04W 84/042* (2013.01)

(58) Field of Classification Search
CPC ....... H04L 67/14; H04W 80/10; H04W 76/11; H04W 12/06; H04W 76/12; H04W 48/18; H04W 84/042; H04W 8/12
See application file for complete search history.

(56) References Cited

U.S. PATENT DOCUMENTS 10,925,113 B2 * 2/2021 Gan ..................... H04L 67/14
2008/0205345 A1   8/2008 Sachs et al.
(Continued)

FOREIGN PATENT DOCUMENTS

CN   108401273 A   8/2018
CN   109246855 A   1/2019
(Continued)

OTHER PUBLICATIONS

3GPP TS 23.502 V15.4.1 3rdGeneration Partnership Project; Technical Specification Group Services and System Aspects; Procedures for the 5G System; Jan. 2019, pp. 72-73(Year: 2019).*
(Continued)

*Primary Examiner* — Maharishi V Khirodhar
*Assistant Examiner* — Kenneth P Hunt
(74) *Attorney, Agent, or Firm* — Murphy, Bilak & Homiller, PLLC

(57) ABSTRACT

Exemplary embodiments include methods for establishing a user-requested protocol data unit (PDU) session in a user's visited public land mobile network (VPLMN), by a session management function (V-SMF) in the VPLMN. Such methods include receiving, from an access and mobility management function (AMF) in the VPLMN, a PDUSession_CreateSMContext Request to establish the PDU session to be routed through the user's home PLMN (HPLMN). The PDUSession_CreateSMContext Request identifies an SMF (H-SMF) in the user's HPLMN. Such methods include sending, to the identified H-SMF, a PDUSession_Create Request to create the PDU session. The PDUSession_Create Request includes an identifier of a session management (SM) context, in the V-SMF, that is associated with the PDU session. Such methods include receiving, from the H-SMF, a PDUSession_Update Request that includes an identifier of an SM context, in the H-SMF, that is associated with the
(Continued)

PDU session. Embodiments also include complementary methods performed by the H-SMF.

20 Claims, 19 Drawing Sheets

Related U.S. Application Data continuation of application No. 16/382,291, filed on Apr. 12, 2019, now Pat. No. 10,925,113.

(60) Provisional application No. 62/805,128, filed on Feb. 13, 2019.

(51) Int. Cl.
    *H04W 76/11*    (2018.01)
    *H04W 84/04*    (2009.01)

(56) References Cited

U.S. PATENT DOCUMENTS

| | | | |
|---|---|---|---|
| 2017/0339609 A1 | 11/2017 | Youn et al. | |
| 2018/0376384 A1 | 12/2018 | Youn et al. | |
| 2019/0191467 A1* | 6/2019 | Dao | H04W 76/11 |
| 2020/0037376 A1 | 1/2020 | Hou et al. | |
| 2020/0084829 A1* | 3/2020 | Tang | H04W 48/16 |
| 2020/0163134 A1 | 5/2020 | Ying et al. | |

FOREIGN PATENT DOCUMENTS

| | | |
|---|---|---|
| RU | 2384020 C2 | 3/2010 |
| WO | 2018146068 A1 | 8/2018 |
| WO | 2018175282 A1 | 9/2018 |
| WO | 2019020117 A1 | 1/2019 |

OTHER PUBLICATIONS

"3GPP TS 23.502 Draft V16.0.0+", 3rd Generation Partnership Project; Technical Specification Group Services and System Aspects; Procedures for the 5G System; Stage 2 (Release 16), Feb. 2019, pp. 1-412.

"3GPP TS 29.502 V15.2.1", 3rd Generation Partnership Project; Technical Specification Group Core Network and Terminals; 5G System; Session Management Services; Stage 3 (Release 15), Dec. 2018, pp. 1-144.

"3GPP TS 29.502 V15.4.0", 3rd Generation Partnership Project; Technical Specification Group Core Network and Terminals; 5G System; Session Management Services; Stage 3 (Release 15), Jun. 2019, pp. 1-9.

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"OI#14a: 23.502: PDU session flows: N16 RESTful design", SA WG2 Meeting #123; S2-177023; Ljubljana, SL, Oct. 23-27, 2017, pp. 1-18.

"User plane security policy", 3GPP TSG-WG2 Meeting #126; S2-182991; Montreal, Canada, Feb. 26-Mar. 2, 2018, pp. 1-30.

"3GPP TS 24.301 V15.5.0", 3rd Generation Partnership Project; Technical Specification Group Core Network and Terminals; Non-Access-Stratum (NAS) protocol for Evolved Packet System (EPS); Stage 3 (Release 15), Dec. 2018, pp. 1-536.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 23.503 V15.0.0", 3rd Generation Partnership Project; Technical Specification Group Services and System Aspects; Policy and Charging Control Framework for the 5G System; Stage 2 (Release 15), Dec. 2017, pp. 1-56.

"3GPP TS 23.502 V15.4.1", 3rd Generation Partnership Project; Technical Specification Group Services and System Aspects; Procedures for the 5G System; Stage 2 (Release 15), Jan. 2019, pp. 1-347.

"3GPP TS 33.501 V15.3.1", 3rd Generation Partnership Project; Technical Specification Group Services and System Aspects; Security architecture and procedures for 5G system (Release 15), Dec. 2018, pp. 1-181.

"3GPP TS 23.501 V15.4.0", 3rd Generation Partnership Project; Technical Specification Group Services and System Aspects; System Architecture for the 5G System; Stage 2 (Release 15) , Dec. 2018, pp. 1-236.

\* cited by examiner

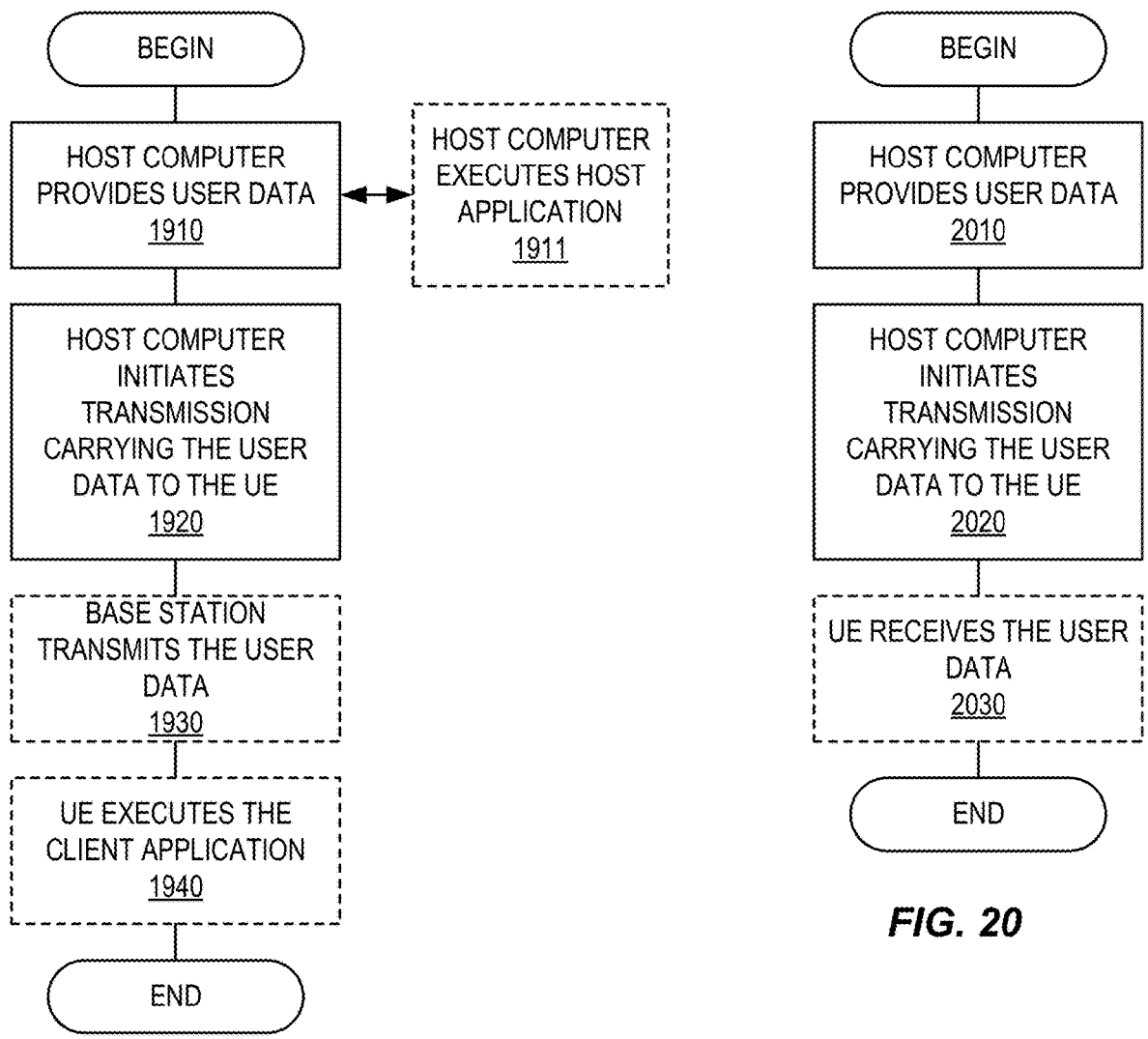

SECONDARY AUTHORIZATION AT PDU SESSION ESTABLISHMENT FOR HOME ROUTED ROAMING

TECHNICAL FIELD

The present application relates generally to the field of telecommunications and more specifically to facilitate establishment of data sessions when a user is roaming from the user's home network into another network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

In 3GPP, a study item on a new radio interface for a fifth-generation (5G) cellular (e.g., wireless) network has recently been completed. 3GPP is now standardizing this new radio interface, often abbreviated by NR (New Radio). FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 3 (and described in TS 38.401 and TR 38.801) include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 5, DC can be achieved by allowing a UE to connect to multiple DUs served by the same CU or by allowing a UE to connect to multiple DUs served by different CUs.

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410*a,b*) and ng-eNBs 420 (e.g., 420*a,b*) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430*a, b*) via respective NG-C interfaces and to the UPF (User Plane Function) 440 (e.g., UPFs 440*a,b*) via respective NG-U interfaces.

Each of the gNBs 410 can support the NR radio interface, including frequency division duplexing (FDD), time division duplexing (TDD), or a combination thereof. In contrast, each of ng-eNBs 420 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions provide one or more services to one or more service consumers. This can be done, for example, by Hyper Text Transfer Protocol/Representational State Transfer (HTTP/REST) application programming interfaces (APIs).

The services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

This architecture model, which further adopts principles like modularity, reusability and self-containment of network functions, can enable deployments to take advantage of the latest virtualization and software technologies. FIG. 5 shows an exemplary non-roaming 5G reference architecture with service-based interfaces and various network functions within the Control Plane (CP). These include:

- Access and Mobility Management Function (AMF) with Namf interface;
- Session Management Function (SMF) with Nsmf interface;
- User Plane Function (UPF) with Nupf interface;
- Policy Control Function (PCF) with Npcf interface;
- Network Exposure Function (NEF) with Nnef interface;
- Network Repository Function (NRF) with Nnrf interface;
- Network Slice Selection Function (NSSF) with Nnssf interface;
- Authentication Server Function (AUSF) with Nausf interface;
- Application Function (AF) with Naf interface; and
- Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

FIG. 6 shows an exemplary roaming 5G reference architecture with service-based interfaces. In this reference architecture, the user roams into a Visited Public Land Mobile Network (VPLMN) that is different than the user's Home PLMN (HPLMN). In particular, FIG. 6 shows a roaming architecture that supports home-routed data services, in which the home operator's administrative domain is involved in the user's data session and the UE interfaces the data network (DN) in the HPLMN. From the user's perspective, the various network functions of the HPLMN shown in the non-roaming architecture of FIG. 5 are distributed among the HPLMN and VPLMN in the home-routed roaming architecture shown in FIG. 6. For example, the AMF is in the VPLMN, the AUSF is in the HPLMN, and the SMF and UPF exist in both (e.g., are split between) VPLMN and HPLMN. To distinguish between these functions existing in both networks, a prefix of "H" or "V" can be used, such as "H-UPF" and "V-UPF".

In both roaming and non-roaming scenarios, a user (e.g., a UE) may want to establish a data session (also referred to as a "PDU session") with a data network (DN, e.g., Internet) via the 5G network. The session is managed by a resource in the SMF which is created by an create Session management context request when establishing the session. The term "PDU", short for "protocol data unit," is often used to refer to a unit of data specified in a protocol layer and comprising protocol control information and possibly user data. "PDU" is often used interchangeably with "packet." A PDU Session establishment may correspond to any of the following:

- a UE initiated PDU Session Establishment procedure;
- a UE initiated PDU Session handover between 3GPP and non-3GPP networks;
- a UE initiated PDU Session handover from LTE to NR (e.g., EPC to 5GC); and
- a network-triggered PDU Session Establishment procedure. In this case, the network sends the device trigger message to application(s) on the UE side. The payload included in Device Trigger Request message contains information on which application on the UE side is expected to trigger the PDU Session establishment request. Based on that information, the application(s) on the UE side trigger the PDU Session Establishment procedure.

For a UE-initiated (or UE-requested) PDU session establishment based on home-routed roaming, functions in the VPLMN often need to exchange information about the user with their peer and/or corresponding function in the HPLMN. For example, the V-SMF often needs to exchange information with the H-SMF. However, various problems and/or difficulties can arise due to the VPLMN function (e.g., V-SMF) lacking necessary information about the corresponding HPLMN function (e.g., H-SMF).

SUMMARY

Accordingly, exemplary embodiments of the present disclosure address these and other difficulties in PDU session establishment based on home-routed roaming techniques.

Exemplary embodiments of the present disclosure include methods and/or procedures for establishing a user-requested PDU session to be routed through the user's HPLMN. The exemplary methods and/or procedures can be performed by a session management function (e.g., SMF) or node in a visited PLMN that is different than the HPLMN of the user establishing the PDU session.

The exemplary methods and/or procedures can include receiving, from an access management function (AMF) in the VPLMN, a first request to establish a home-routed PDU session, wherein the first request identifies an SMF (H-SMF) in the HPLMN. The exemplary methods and/or procedures can also include sending, to the H-SMF, a second request to create the home-routed PDU session. The second request can include an identifier of a resource in the V-SMF associated with the PDU session. The second request can also include one or more indicators of whether the V-SMF supports respective one or more features related to receiving, from the H-SMF, an identifier of a resource in the H-SMF that is associated with the PDU session.

In some embodiments, the one or more indicators can include an indicator that the V-SMF supports early delivery of the identifier of the resource in the H-SMF. In such embodiments, the exemplary methods and/or procedures can also include receiving from the H-SMF, a third request that includes the identifier of the resource in the H-SMF, the third request being received before receiving any other messages from the H-SMF.

In some embodiments, the one or more indicators can include an indicator that the V-SMF supports delayed sending of a response to a third request. In such embodiments, the exemplary methods and/or procedures can also include receiving, from the H-SMF, a third request comprising a further indicator that the V-SMF should delay sending a response to the third request until after receiving, from the AMF, authentication information relating to the user. In such embodiments, the exemplary methods and/or procedures can also include, after receiving the authentication information from the AMF, sending the response to the third request to the H-SMF. In such embodiments, the exemplary methods and/or procedures can also include subsequently receiving a response, to the second request, comprising the identifier of the resource in the H-SMF.

Other exemplary embodiments of the present disclosure include methods and/or procedures for establishing a user-requested PDU session to be routed from a user's VPLMN through the user's HPLMN. These exemplary methods and/or procedures can be performed by a session management function (e.g., SMF) or node in a HPLMN (e.g., a H-SMF) that is different from the VPLMN where the user is initiating the PDU session.

The exemplary methods and/or procedures can include receiving, from a SMF of the VPLMN (V-SMF), a second request to create a home-routed PDU session. The second request can include an identifier of a resource in the V-SMF that is associated with the PDU session. The second request can also include one or more indicators of whether the V-SMF supports respective one or more features related to receiving, from the H-SMF, an identifier of a resource in the H-SMF that is associated with the PDU session. The exemplary methods and/or procedures can also include, based on the one or more indicators, sending one or more messages to the V-SMF, with each message including one of the following: a further indicator; and the identifier of the resource in the H-SMF.

In some embodiments, the one or more indicators can include an indicator that the V-SMF supports early delivery of the identifier of the resource in the H-SMF. In such embodiments, one of the messages sent to the V-SMF can be a third request that includes the identifier of the resource in the H-SMF, the third request being sent before sending any other messages to the V-SM F.

In some embodiments, the one or more indicators can include an indicator that the V-SMF supports delayed sending of a response to a third request. In such embodiments, the one or more messages sent to the V-SMF can be a third request comprising a further indicator that the V-SMF should delay sending a response to the third request until after receiving authentication information relating to the user. In such embodiments, the exemplary methods and/or procedures can also include receive the response to the third request from the V-SMF. In such embodiments, the one or more messages sent to the V-SMF can also include a response, to the second request, comprising the identifier of the resource in the H-SMF, with the response to the second request being sent after receiving the response to the third request.

Other exemplary embodiments include session management nodes, functions, and/or services (e.g., SMF components thereof) configured to perform operations corresponding to the exemplary methods and/or procedures. Other exemplary embodiments include non-transitory, computer-readable media storing computer-executable instructions that, when executed by a processing circuit comprising a network node, configure the network node to perform operations corresponding to the exemplary methods and/or procedures.

BRIEF DESCRIPTION OF THE DRAWINGS

FIGS. 19-22 are flow diagrams of exemplary methods and/or procedures for transmission and/or reception of user data that can be implemented, for example, in the exemplary communication systems and/or networks illustrated in FIGS. 17-18.

DETAILED DESCRIPTION

Figure 1:
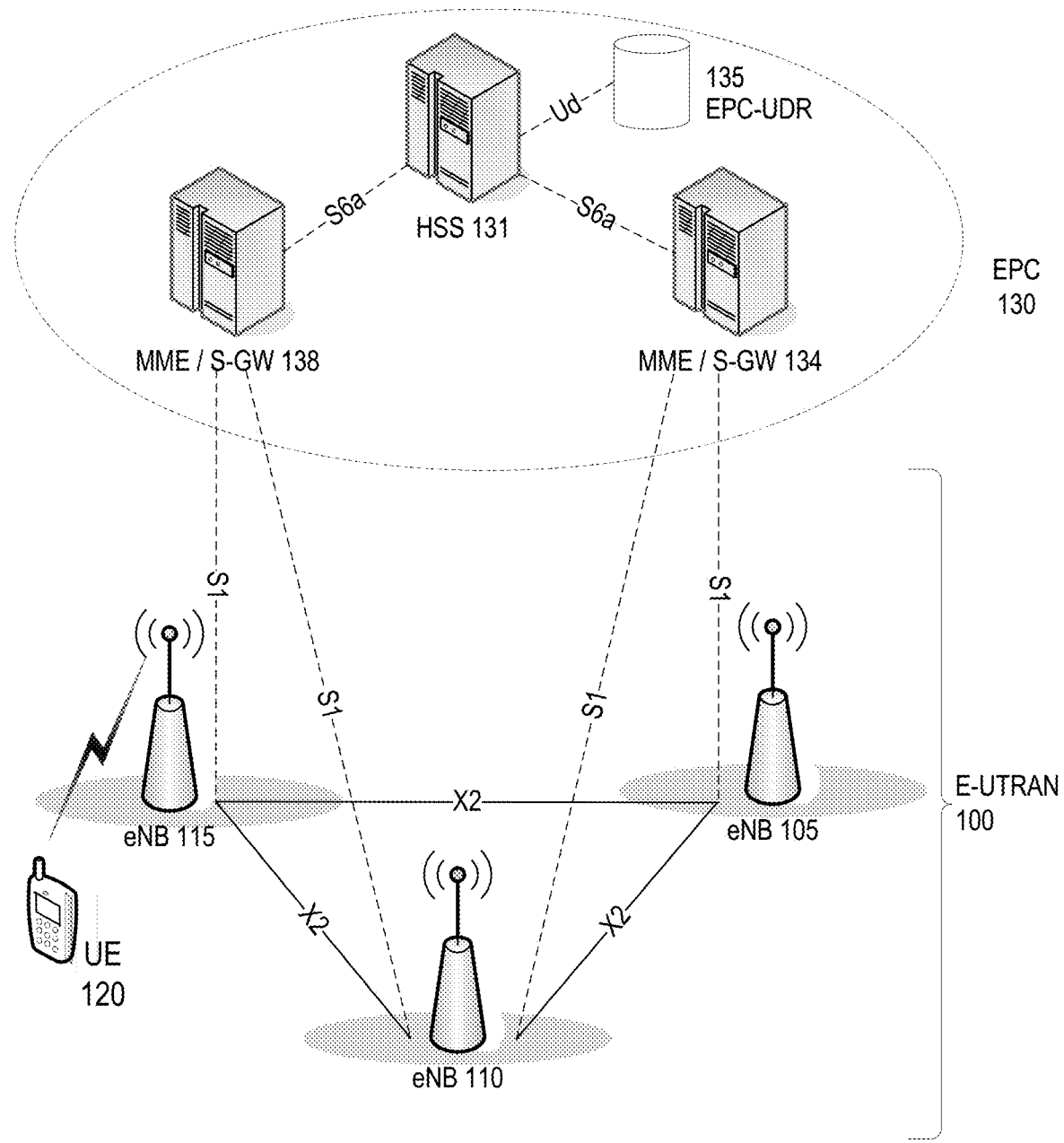
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
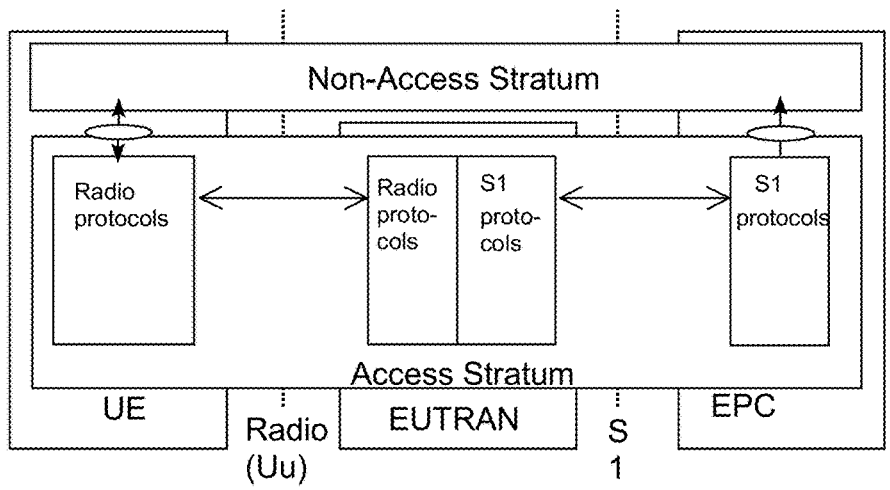
FIG. 2A is a high-level block diagram of an exemplary E-UTRAN architecture in terms of its constituent components, protocols, and interfaces.
Figure 2B:
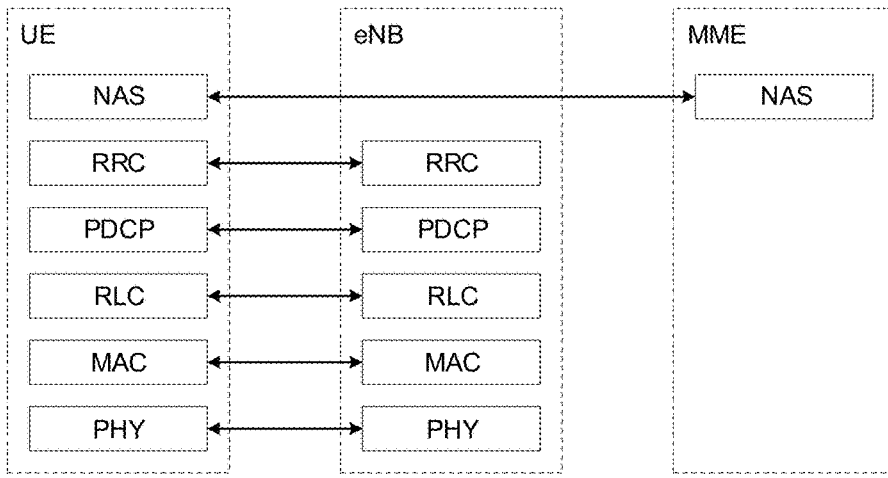
FIG. 2B is a block diagram of exemplary protocol layers of the control-plane portion of the radio (Uu) interface between a user equipment (UE) and the E-UTRAN.
Figure 2C:
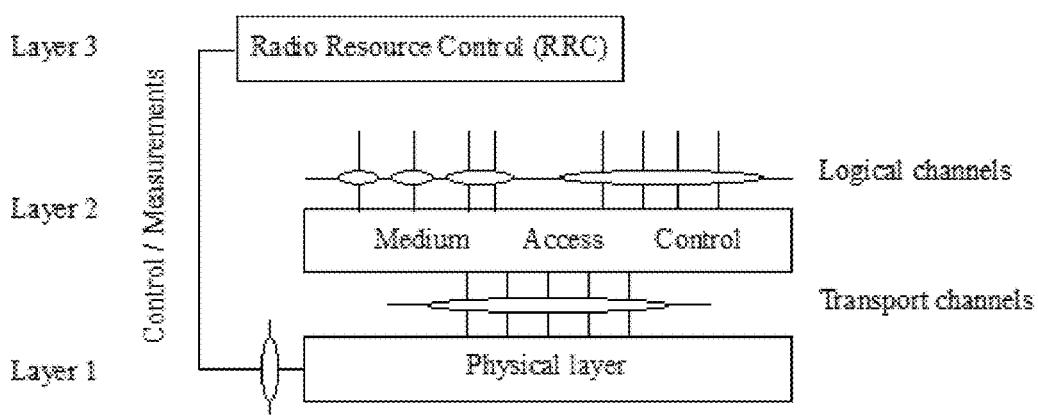
FIG. 2C is a block diagram of an exemplary LTE radio interface protocol architecture from the perspective of the PHY layer.
Figure 3:
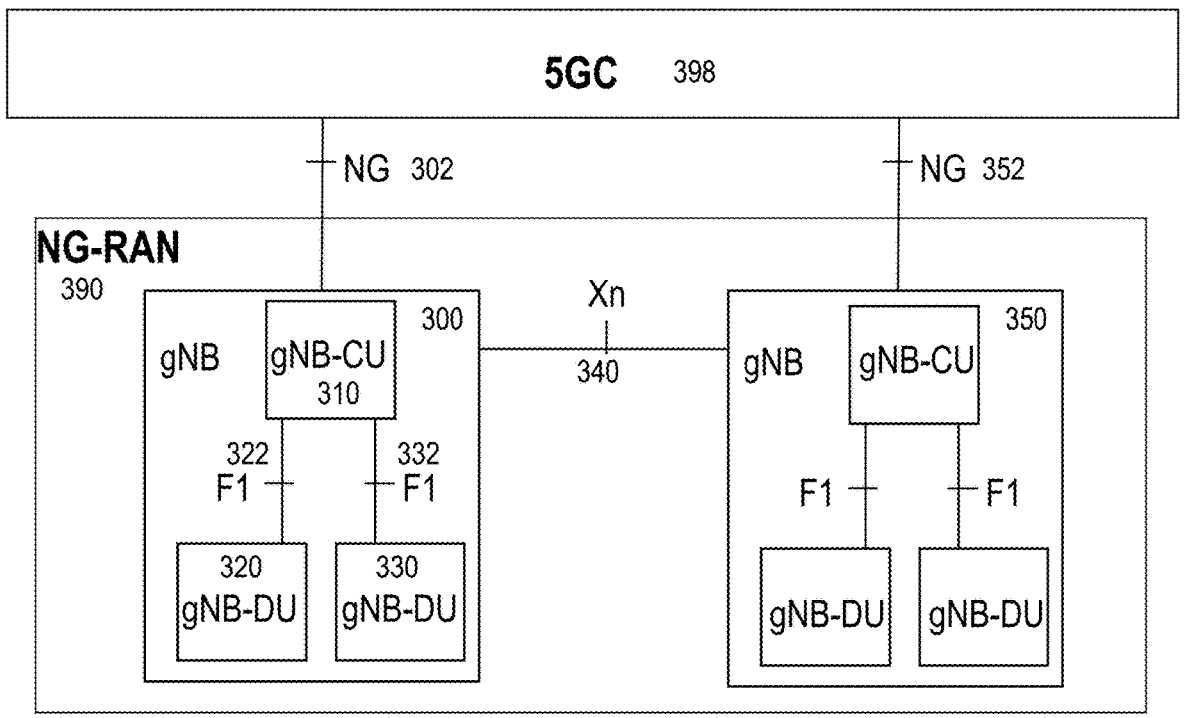
FIG. 3 illustrates a high-level view of the 5G network architecture, including split central unit (CU)-distributed unit (DU) split architecture of gNBs.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

- Radio Node: As used herein, a "radio node" can be either a "radio access node" or a "wireless device."
- Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), a relay nod, access point (AP), radio AP, remote radio unit (RRU), remote radio head (RRH), a multi-standard BS (a.k.a. MSR BS), multi-cell/multicast coordination entity (MCE), base transceiver station (BTS), base station controller (BSC), network controller, Node B, etc. Such terms can also be used to reference to components of a node, such as a gNB-CU and/or a gNB-DU.
- Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.
- Wireless Device: As used herein, a "wireless device" is any type of device that has access to (i.e., is served by) a cellular communications network by wirelessly transmitting and/or receiving signals to a radio access node (s). Some examples of a wireless device include, but are not limited to, a UE in a 3GPP network and a Machine Type Communication (MTC) device.
- User Equipment: As used herein, a user equipment (or UE, for short) can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.
- Network Node: As used herein, a "network node" is any node that is either part of the radio access network (e.g., a "radio network node" or "radio access node") or the core network (e.g., a "core network node") of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. And to the extent that the descriptions of various embodiments refer to NR, such described embodiments are not limited to NR, but can be adapted in other radio access technologies including LTE, UTRA, LTE-Advanced, 5G, NX, NB-IoT, WiFi, BlueTooth, etc.

Furthermore, although the term "cell" is used herein, it should be understood that (particularly with respect to 5G NR) beams may be used instead of cells and, as such, concepts described herein apply equally to both cells and beams.

As discussed above, for a UE-initiated (or UE-requested) PDU session establishment based on home-routed roaming, functions in the VPLMN often need to exchange information about the user with their peer and/or corresponding function in the HPLMN. However, various problems and/or difficulties can arise due to the VPLMN function (e.g., V-SMF) lacking necessary information about the corresponding HPLMN function (e.g., H-SMF). These are discussed below in more detail.

Figure 7:
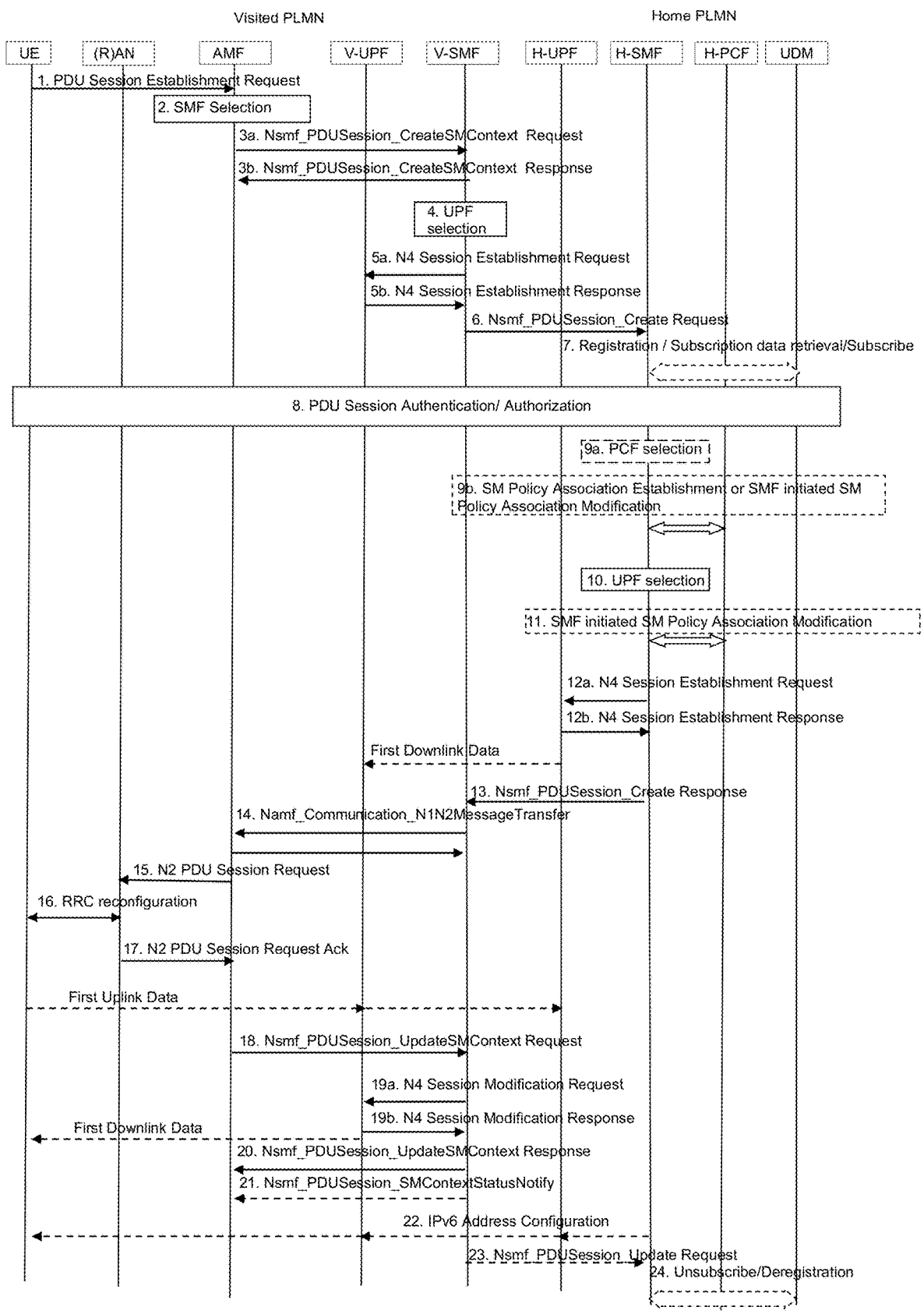
FIG. 7 shows an exemplary signalling flow of an establishment procedure for a UE-requested PDU session based on home-routed roaming.

FIG. 7 shows an exemplary signalling flow of an establishment procedure for a UE-requested PDU session based on home-routed roaming. Although the operations shown in FIG. 7 are labelled with numbers, this labelling is only to facilitate clarity of description, and should not be interpreted as limiting the operations to occur in the order of their numerical labelling. In other words, unless expressly noted otherwise, the operations shown in FIG. 7 can occur in different orders than shown, and can be combined and/or divided to form other operations. The operations shown in FIG. 7 are described as follows. To the extent that this description refers to 3GPP standards, the relevant portions of these standards are incorporated herein by reference.

1. From UE to AMF: NAS Message (S-NSSAI(s), DNN, PDU Session ID, Request type, Old PDU Session ID, N1 SM container (PDU Session Establishment Request)).

In order to establish a new PDU Session, the UE generates a new PDU Session ID.

The UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, 5GSM Capability PCO, SM PDU DN Request Container, Number Of Packet Filters, and optionally Always-on PDU Session Requested.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in 3GPP TS 23.501 clause 5.15.7.2.

When Emergency service is required and an Emergency PDU Session is not already established, a UE shall initiate the UE Requested PDU Session Establishment procedure with a Request Type indicating "Emergency Request".

The Request Type indicates "Emergency Request" if the PDU Session Establishment is a request to establish a PDU Session for Emergency services. The Request Type indicates "Existing Emergency PDU Session" if the request refers to an existing PDU Session for Emergency services switching between 3GPP access and non-3GPP access or to a PDU Session handover from an existing PDN connection for Emergency services in EPC.

The 5GSM Core Network Capability is provided by the UE and handled by SMF as defined in 3GPP TS 23.501 clause 5.4.4b. The 5GSM Capability also includes the UE Integrity Protection Maximum Data Rate.

The Number Of Packet Filters indicates the number of supported packet filters for signalled QoS rules for the PDU Session that is being established. The number of packet filters indicated by the UE is valid for the lifetime of the PDU Session.

The NAS message sent by the UE is encapsulated by the AN in a N2 message towards the AMF that should include User location information and Access Type Information.

The PDU Session Establishment Request message may contain SM PDU DN Request Container containing information for the PDU Session authorization by the external DN.

The UE includes the S-NSSAI from the Allowed NSSAI of the current access type. If the Mapping of Allowed NSSAI was provided to the UE, the UE shall provide both the S-NSSAI from the Allowed NSSAI and the corresponding S-NSSAI from the Mapping Of Allowed NSSAI.

If the procedure is triggered for SSC mode 3 operation, the UE shall also include the Old PDU Session ID which indicates the PDU Session ID of the on-going PDU Session to be released, in NAS message. The Old PDU Session ID is an optional parameter which is included only in this case.

The AMF receives from the AN the NAS SM message (built in operation 1) together with User Location Information (e.g., Cell Id in case of the NG-RAN).

The UE shall not trigger a PDU Session establishment for a PDU Session corresponding to a LADN when the UE is outside the area of availability of the LADN.

If the UE is establishing a PDU session for IMS, and the UE is configured to discover the P-CSCF address during connectivity establishment, the UE shall include an indicator that it requests a P-CSCF IP address(es) within the SM container.

The PS Data Off status is included in the PCO in the PDU Session Establishment Request message.

If the UE requests to establish always-on PDU session, the UE includes an Always-on PDU Session Requested indication in the PDU Session Establishment Request message.

2. The AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI for the requested PDU Session either according to the UE subscription, if it contains only one default S-NSSAI, or based on operator policy. When the NAS Message contains an S-NSSAI but it does not contain a DNN, the AMF determines the DNN for the requested PDU Session by selecting the default DNN for this S-NSSAI if the default DNN is present in the UE's Subscription Information; otherwise the serving AMF selects a locally configured DNN for this S-NSSAI. If the AMF cannot select an SMF (e.g. the UE provided DNN is not supported by the network, or the UE provided DNN is not in the Subscribed DNN List for the S-NSSAI and wildcard DNN is not included in the Subscribed DNN list), the AMF shall reject the NAS Message containing PDU Session Establishment Request from the UE with an appropriate cause The AMF selects an SMF as described in 3GPP TS 23.501 clause 6.3.2 and TS 23.502 clause 4.3.2.2.3. In particular, the AMF selects an H-SMF in HPLMN using the S-NSSAI with the value defined by the HPLMN, as described in 3GPP TS 23.502 clause 4.3.2.2.3. The AMF may also receive alternative H-SMFs from the NRF. The AMF stores the association of the S-NSSAI, the DNN, the PDU Session ID, the SMF ID in VPLMN as well as Access Type of the PDU Session If the Request Type indicates "Initial request" or the request is due to handover from EPS or from non-3GPP access serving by a different AMF, the AMF stores an association of the S-NSSAI(s), the DNN, the PDU Session ID, the SMF ID as well as the Access Type of the PDU Session.

If the Request Type is "initial request" and if the Old PDU Session ID indicating the existing PDU Session is also contained in the message, the AMF selects an SMF as described in clause 4.3.5.2 and stores an association of the new PDU Session ID, the S-NSSAI, the selected SMF ID as well as Access Type of the PDU Session.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case. The AMF updates the Access Type stored for the PDU Session.

If the Request Type indicates "Existing PDU Session" referring to an existing PDU Session moved between 3GPP access and non-3GPP access, then if the S-NSSAI of the PDU Session is present in the Allowed NSSAI of the target access type, the PDU Session Establishment procedure can be performed in the following cases:

the SMF ID corresponding to the PDU Session ID and the AMF belong to the same PLMN;

the SMF ID corresponding to the PDU Session ID belongs to the HPLMN;

Otherwise the AMF shall reject the PDU Session Establishment Request with an appropriate reject cause.

NOTE 2: The SMF ID includes the PLMN ID that the SMF belongs to.

The AMF shall reject a request coming from an Emergency Registered UE and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead. The AMF stores the Access Type of the PDU Session.

If the Request Type indicates "Emergency Request" or "Existing Emergency PDU Session", the AMF selects the SMF as described in 3GPP TS 23.501, clause 5.16.4.

In local breakout roaming case, if V-SMF responds to AMF indicating that V-SMF is not able to process some part of the N1 SM information, the AMF proceeds with home routed case from this operation and may select an SMF in the VPLMN different from the V-SMF selected earlier.

3a. As in operation 3 of 3GPP TS 23.502 clause 4.3.2.2.1 with the addition that:

The AMF also provides the identity of the H-SMF it has selected in operation 2 and both the S-NSSAI from the Allowed NSSAI and the corresponding Subscribed S-NSSAI. The H-SMF is provided when the PDU Session is home-routed. The AMF may also provide the identity of alternative H-SMFs, if it has received in operation 2.

The V-SMF does not use DNN Selection Mode received from the AMF but relays this information to the H-SMF.

The AMF may include the H-PCF ID in this operation and V-SMF will pass it to the H-SMF in operation 6. This will enable the H-SMF to select the same H-PCF in operation 9a.

3b. This operation is the same as operation 5 of 3GPP TS 23.502 clause 4.3.2.2.1.

4. The V-SMF selects a UPF in VPLMN as described in 3GPP TS 23.501, clause 6.3.3.

5. The V-SMF initiates an N4 Session Establishment procedure with the selected V-UPF:
   a. The V-SMF sends an N4 Session Establishment Request to the V-UPF. If CN Tunnel Info is allocated by the SMF, the CN Tunnel Info is provided to V-UPF in this operation.
   b. The V-UPF acknowledges by sending an N4 Session Establishment Response. If CN Tunnel Info is allocated by the V-UPF, the CN Tunnel Info is provided to V-SMF in this operation.

6. V-SMF to H-SMF: Nsmf_PDUSession_Create Request (SUPI, GPSI (if available), DNN, S-NSSAI with the value defined by the HPLMN, PDU Session ID, V-SMF ID, V-CN-Tunnel-Info, PDU Session Type, PCO, Number Of Packet Filters, User location information, Access Type, PCF ID, SM PDU DN Request Container, DNN Selection Mode, [Always-on PDU Session Requested]). Protocol Configuration Options may contain information that H-SMF may needs to properly establish the PDU Session (e.g. SSC mode or SM PDU DN Request Container to be used to authenticate the UE by the DN-AAA as defined in clause 4.3.2.3). The H-SMF may use DNN Selection Mode when deciding whether to accept or reject the UE request. If the V-SMF does not receive any response from the H-SMF due to communication failure on the N16 interface, depending on operator policy the V-SMF may create the PDU Session to one of the alternative H-SMF(s) if additional H-SMF information is provided in operation 3a, as specified in detail in TS 29.502 [36].

7-12. These operations are the same as operations 4-10 in 3GPP TS 23.502 clause 4.3.2.2.1 with the following differences:
   These operations are executed in Home PLMN;
   The H-SMF stores an association of the PDU Session and V-SMF ID for this PDU Session for this UE;
   The H-SMF does not provides the Inactivity Timer to the H-UPF as described in operation 9a in 3GPP TS 23.502 clause 4.3.2.2.1;
   The H-SMF registers for the PDU Session ID with the UDM using Nudm_UECM_Registration (SUPI, DNN, S-NSSAI with the value defined by the HPLMN, PDU Session ID); and
   Operation 5 of 3GPP TS 23.502 clause 4.3.2.2.1 is not executed.

When PCF is deployed, the SMF shall further report the PS Data Off status to PCF if the PS Data Off event trigger is provisioned, the additional behaviour of SMF and PCF for 3GPP PS Data Off is defined in 3GPP TS 23.503.

Operation 8 (PDU Session Authentication/Authorization) is described in more detail below with reference to FIG. 8.

13. H-SMF to V-SMF: Nsmf_PDUSession_Create Response (QoS Rule(s), QoS Flow level QoS parameters if needed for the QoS Flow(s) associated with the QoS rule(s), PCO including session level information that the V-SMF is not expected to understand, selected PDU Session Type and SSC mode, H-CN Tunnel Info, QFI(s), QoS profile(s), Session-AMBR, Reflective QoS Timer (if available), information needed by V-SMF in case of EPS interworking such as the PDN Connection Type, User Plane Policy Enforcement).

If the PDU Session being established was requested to be an always-on PDU Session, the H-SMF shall indicate to the V-SMF whether the request is accepted or not via the Always-on PDU Session Granted indication in the response message to V-SMF. If the PDU Session being established was not requested to be an always-on PDU Session but the H-SMF determines that the PDU Session needs to be established as an always-on PDU Session, the H-SMF shall indicate it to the V-SMF by including Always-on PDU Session Granted indication that the PDU Session is an always-on PDU Session.

Figure 4:
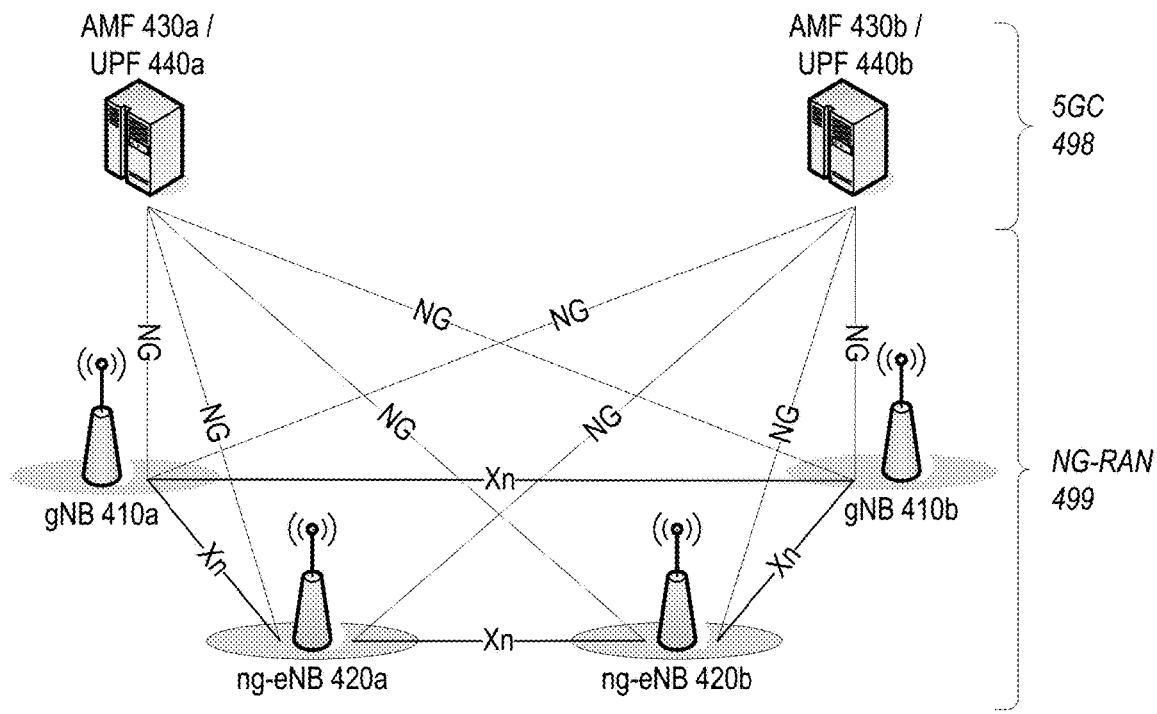
FIG. 4 illustrates a different high-level view of the 5G network architecture.
Figure 5:
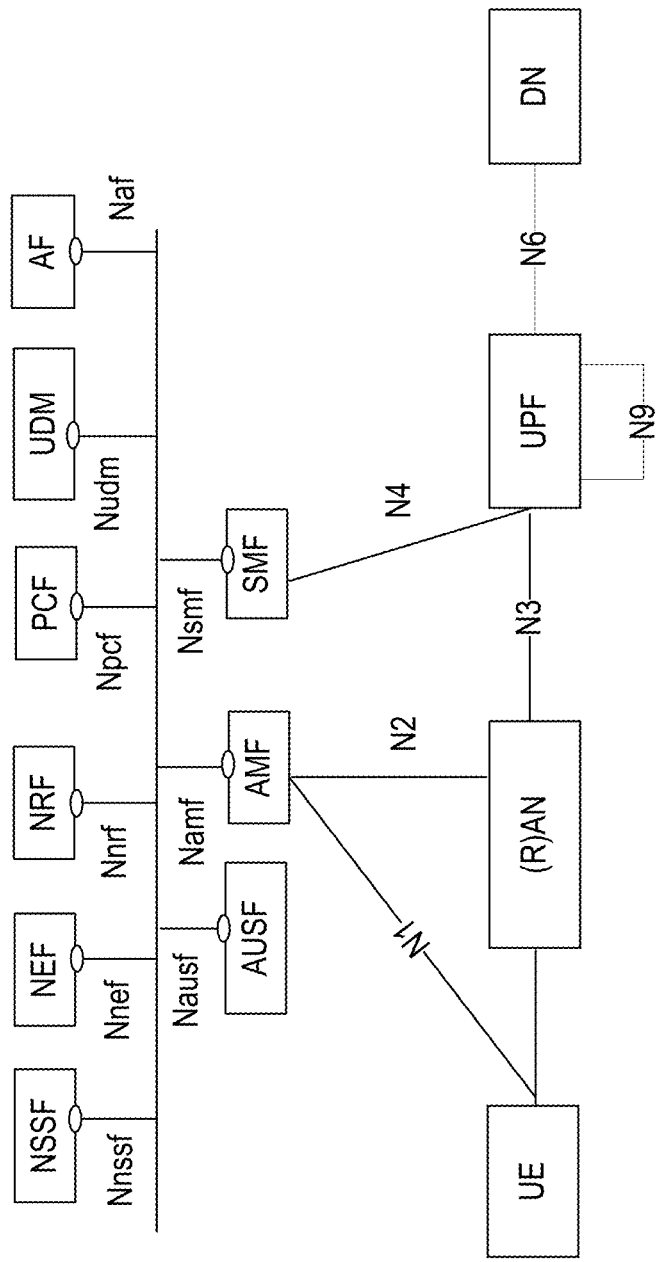
FIG. 5 shows an exemplary non-roaming 5G reference architecture with service-based interfaces and various network functions within the control plane (CP), as further explained in 3GPP TS 23.501.
Figure 6:
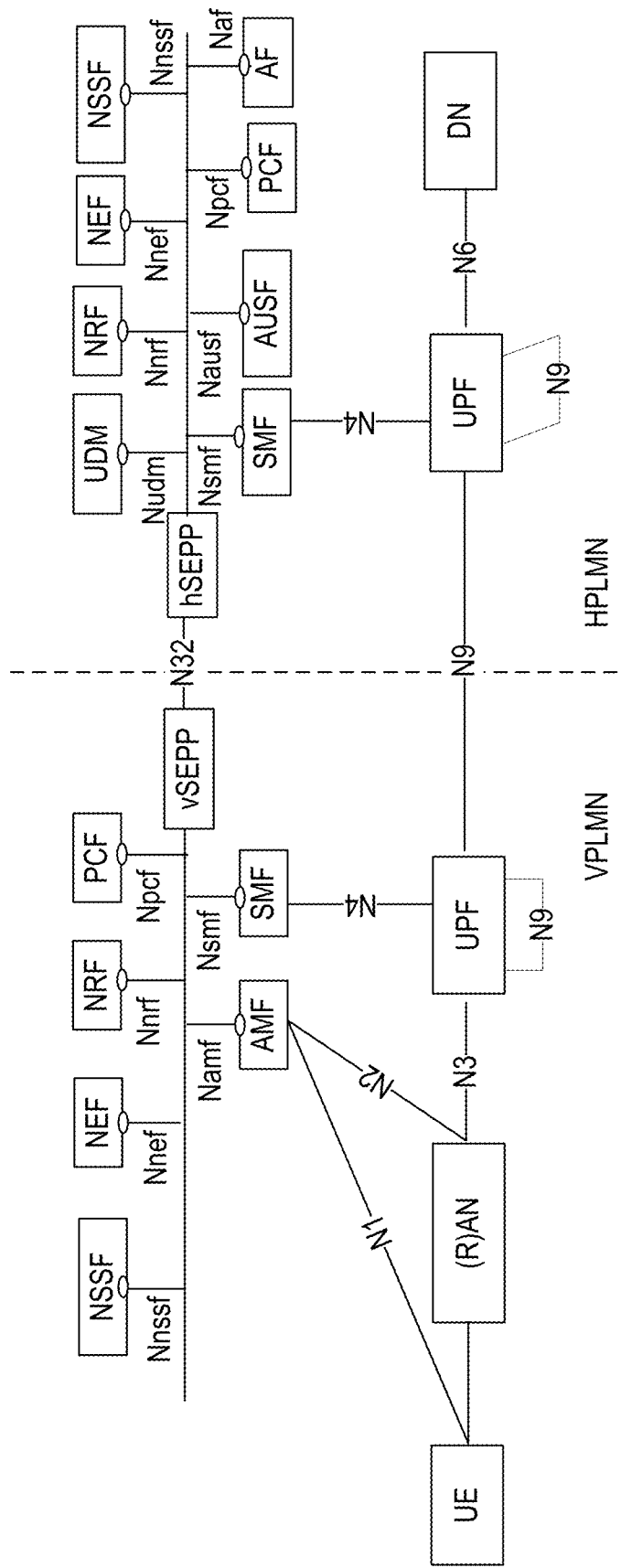
FIG. 6 shows an exemplary roaming 5G reference architecture with service-based interfaces that supports home-routed data sessions, as further explained in 3GPP TS 23.501.

The information that the H-SMF may provide is the same as defined for operation 11 shown in 3GPP TS 23.502 FIG. 4.3.2.2.1-1.

The H-CN Tunnel Info contains the tunnel information for uplink traffic towards H-UPF.

Multiple QoS Rules and QoS Flow level QoS parameters for the QoS Flow(s) associated with the QoS rule(s) may be included in the Nsmf_PDUSession_Create Response.

14-18. These operations are the same as operations 11-15 in 3GPP TS 23.502 clause 4.3.2.2.1 with the following differences:
   These operations are executed in Visited PLMN;
   The V-SMF stores an association of the PDU Session and H-SMF ID for this PDU Session for this UE;
   If the H-SMF indicates the PDU Session can be established as an always-on PDU Session, the V-SMF shall further check whether the PDU Session can be established as an always-on PDU Session based on local policies. The V-SMF notifies the UE whether the PDU Session is an always-on PDU Session or not via the Always-on PDU Session Granted indication in the PDU Session Establishment Accept message.

19a. The V-SMF initiates an N4 Session Modification procedure with the V-UPF. The V-SMF provides Packet detection, enforcement and reporting rules to be installed on the V-UPF for this PDU Session, including AN Tunnel Info, H-CN Tunnel Info and V-CN Tunnel Info.

19b. The V-UPF provides a N4 Session Modification Response to the V-SMF. After this operation, the V-UPF delivers any down-link packets to the UE that may have been buffered for this PDU Session.

20. This operation is the same as operation 17 in 3GPP TS 23.502 clause 4.3.2.2.1 except that SMF is V-SMF.

21. This operation is same as operation 18 in 3GPP TS 23.502 clause 4.3.2.2.1.

22. H-SMF to UE, via H-UPF and V-UPF in VPLMN: In case of PDU Session Type IPv6 or IPv4v6, the H-SMF generates an IPv6 Router Advertisement and sends it to the UE via N4 and the H-UPF and V-UPF.

23. If the V-SMF received in operation18 an indication that the (R)AN has rejected some QFI(s) the V-SMF notifies the H-SMF via a Nsmf_PDUSession_Update Request. The H-SMF is responsible of updating accordingly the QoS rules and QoS Flow level QoS parameters if needed for the QoS Flow(s) associated with the QoS rule(s) in the UE.

24. Unsubscribe/Deregistration: This operation is the same as operation 20 in 3GPP TS 23.502 clause 4.3.2.2.1 except that this operation is executed in the HPLMN.

NOTE: The H-SMF can initiate operation 21 already after operation 13.

Figure 8:
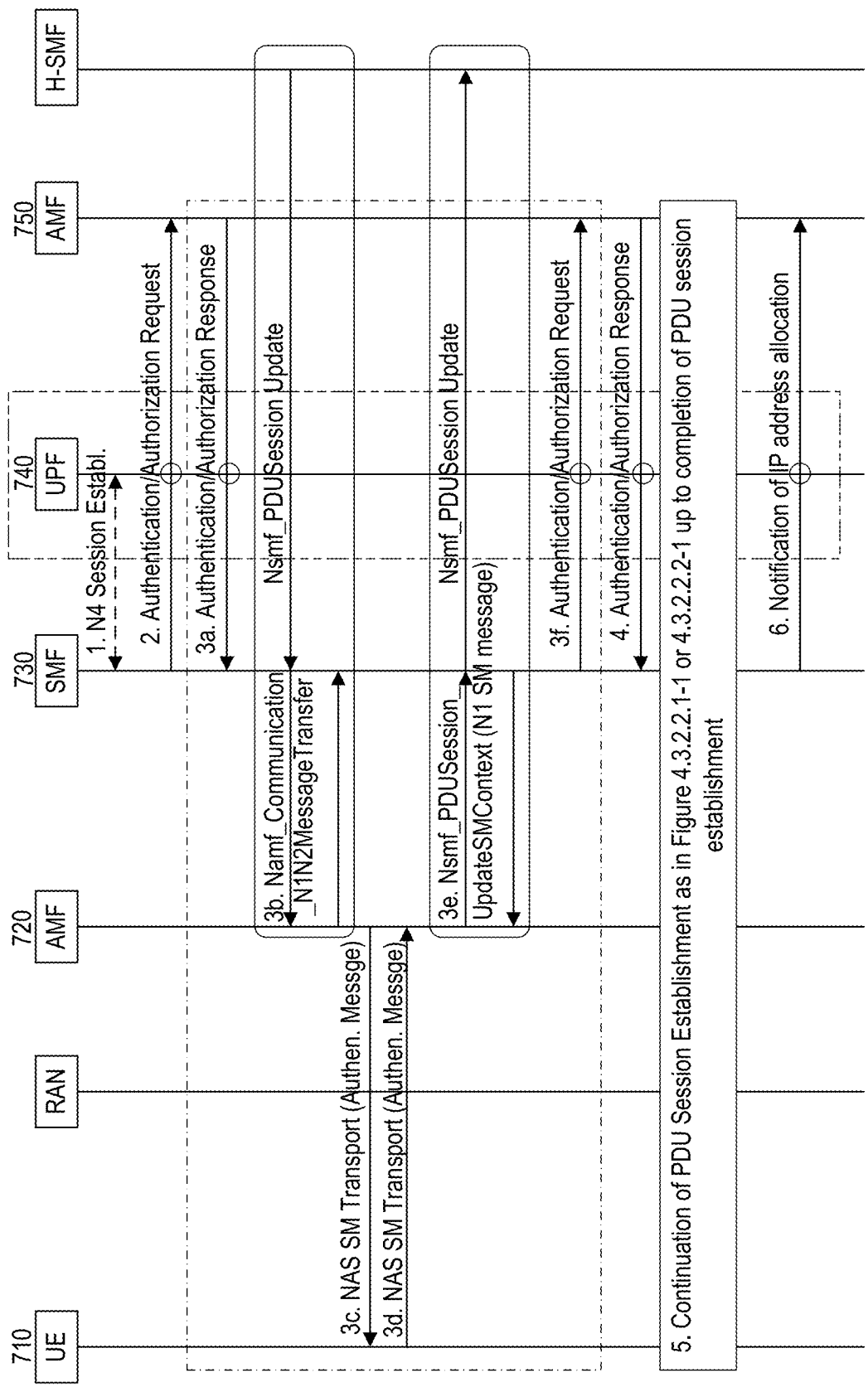
FIG. 8 shows an exemplary signalling flow of a PDU session establishment authentication/authorization procedure by a DN AAA server.

FIG. 8 shows an exemplary signalling flow of a PDU session establishment authentication/authorization procedure by a DN AAA server. This procedure can correspond to operation 8 shown in FIG. 7 above, for example. for a UE-requested PDU session based on home-routed roaming. Although the operations shown in FIG. 8 are labelled with numbers, this labelling is only to facilitate clarity of description, and should not be interpreted as limiting the operations to occur in the order of their numerical labelling. In other words, unless expressly noted otherwise, the operations shown in FIG. 8 can occur in different orders than shown, and can be combined and/or divided to form other operations. The operations shown in FIG. 8 are described as follows. To the extent that this description refers to 3GPP standards, the relevant portions of these standards are incorporated herein by reference.

0. The SMF determines that it needs to contact the DN-AAA server. This can occur, for example, if the SMF is an H-SMF that is contacted by a V-SMF regarding establishment of a PDU session for a user roaming into the VPLMN, such as illustrated in FIG. 7. The SMF identifies the DN-AAA server based on local configuration, possibly using the SM PDU DN Request Container provided by the UE in its NAS request.

1. If there is no existing N4 session that can be used to carry DN-related messages between the SMF and the DN, the SMF selects a UPF and triggers N4 session establishment.

2. The SMF provides a SM PDU DN Request Container received from the UE to the DN-AAA via the UPF.

3. When available, the SMF provides the GPSI in the signalling exchanged with the DN-AAA.

The UPF transparently relays the message received from the SMF to the DN-AAA server.

NOTE 2: The content of SM PDU DN Request Container is defined in 3GPPTS 33.501.

3a. The DN-AAA server sends an Authentication/Authorization message towards the SMF. The message is carried via the UPF.

3b. Transfer of DN Request Container information received from DN-AAA towards the UE.

In non-roaming and LBO cases, the SMF invokes the Namf_Communication_N1N2MessageTransfer service operation on the AMF to transfer the DN Request Container information within N1 SM information sent towards the UE.

In the case of Home Routed roaming, the H-SMF initiates a Nsmf_PDUSession_Update service operation to request the V-SMF to transfer DN Request Container to the UE and the V-SMF invokes the Namf_Communication_N1N2MessageTransfer service operation on the AMF to transfer the DN Request Container information within N1 SM information sent towards the UE.

3c. The AMF sends the N1 NAS message to the UE.

3d-e. Transfer of DN Request Container information received from UE towards the DN-AAA. When the UE responds with a N1 NAS message containing DN Request Container information, the AMF informs the SMF by invoking the Nsmf_PDUSession_UpdateSMContext service operation. The SMF issues an Nsmf_PDUSession_UpdateSMContext response.

In the case of Home Routed roaming, the V-SMF relays the N1 SM information to the H-SMF via a Nsmf_PDUSession_Update service operation.

3f. The SMF (In HR case it is the H-SMF) sends the content of the DN Request Container information (authentication message) to the DN-AAA server via the UPF.

The operations 3a-f may be repeated until the DN-AAA server confirms the successful authentication/authorization of the PDU Session.

4. The DN-AAA server confirms the successful authentication/authorization of the PDU Session. The DN-AAA server may provide:
   an SM PDU DN Response Container to the SMF to indicate successful authentication/authorization;
   authorization information as defined in 3GPP TS 23.501 clause 5.6.6;
   a request to get notified with the IP address(es) allocated to the PDU Session and/or with N6 traffic routing information or MAC address(es) used by the UE for the PDU Session; and
   an IP address (or IPV6 Prefix) for the PDU Session.

The N6 traffic routing information is defined in 3GPP TS 23.501 clause 5.6.7.

After the successful DN authentication/authorization, a session is kept between the SMF and the DN-AAA.

5. The PDU Session establishment continues and completes.

6. If requested so in operation 4 or if configured so by local policies, the SMF notifies the DN-AAA with the IP/MAC address(es) and/or with N6 traffic routing information allocated to the PDU Session together with the GPSI.

Subsequently, the SMF can notify the DN-AAA if the DN-AAA had requested to get notifications about actions and/or conditions such as:
   Allocation or release of an IPV6 Prefix for the PDU Session of IP type or
   Addition or removal of source MAC addresses for the PDU Session of Ethernet type (e.g. using IPV6 multi-homing as defined in 3GPP TS 23.501 clause 5.6.4.3;
   Change of N6 traffic routing information; and/or
   Release of the PDU session (as described in 3GPP TS 23.502 clause 4.3.4.

The DN-AAA server may revoke the authorization for a PDU Session or update DN authorization data for a PDU Session. According to the request from DN-AAA server, the SMF may release or update the PDU Session.

At any time after the PDU Session establishment, the DN-AAA server or SMF may initiate Secondary Re-authentication procedure for the PDU Session as specified in 3GPP TS 33.501 clause 11.1.3. Operations 3a-f are performed to transfer the Secondary Re-authentication message between the UE and the DN-AAA server. The Secondary Re-authentication procedure may start from operation 3a (DN-AAA initiated Secondary Re-authentication procedure) or operation 3b (SMF initiated Secondary Re-authentication procedure). For the DN-AAA server initiated Secondary Re-authentication, the message in operation 3a shall include GPSI, if available, and the IP/MAC address(es) of the PDU session, for SMF to identify the corresponding UE and PDU session.

Figure 9:
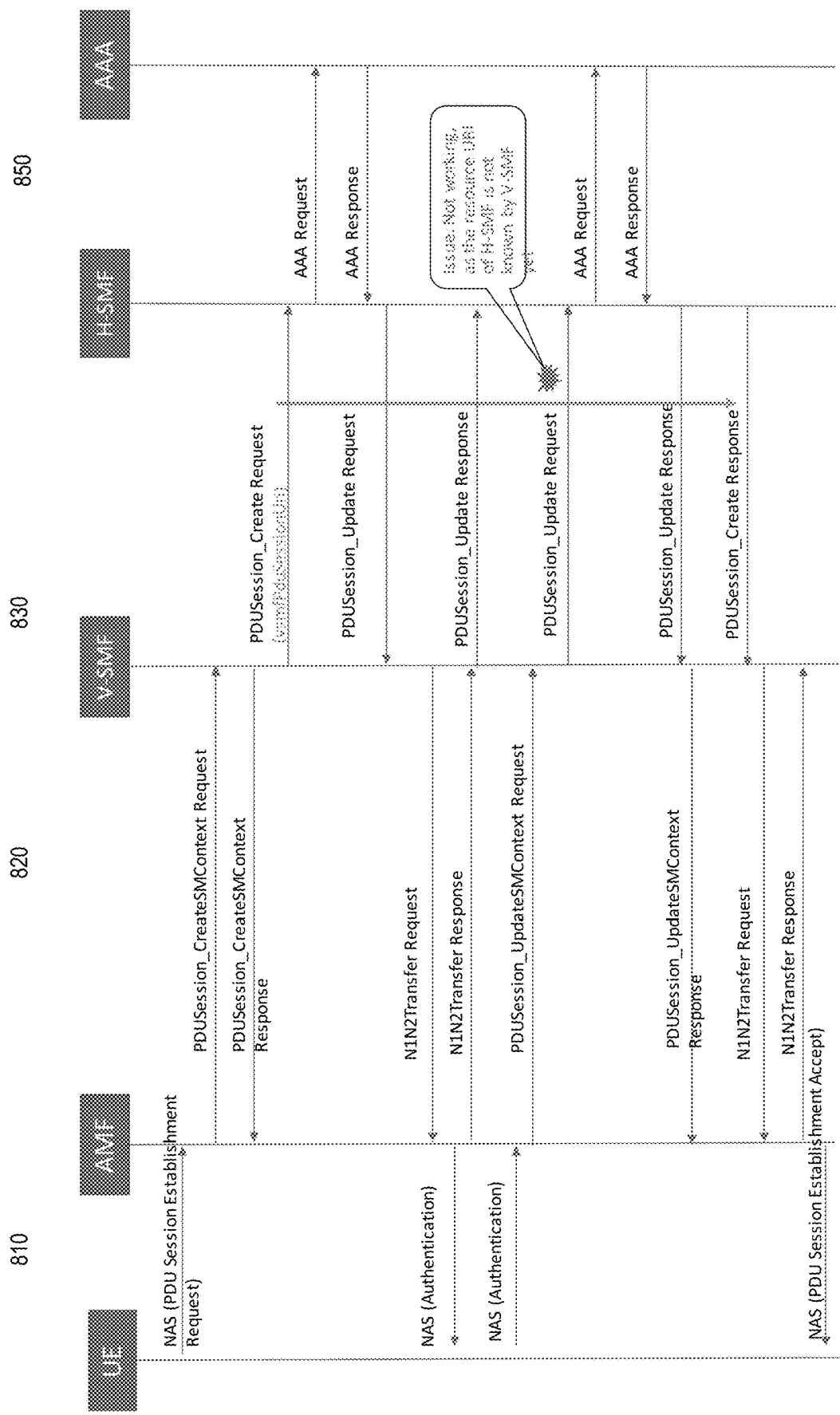
FIG. 9 shows an exemplary simplified signalling flow of an establishment procedure for a UE-requested PDU session based on home-routed roaming.

Nevertheless, there are certain problems in the signalling for the home-routed roaming scenario illustrated in FIGS. 7-8. For example, in operation 3e shown in FIG. 8, the V-SMF is not able to send Nsmf_PDUSession_Update request to the H-SMF because the V-SMF does not have an identifier (e.g., URI) of the resource created in H-SMF for the PDU session (referred to as "hsmfPDUSessionUri"). This problem is illustrated in the simplified signalling flow shown in FIG. 9. For example, in conventional operation, the V-SMF does not receive the hsmfPDUSessionUri from the H-SMF until the PDU_Session_Create Response, as illustrated in FIG. 9. Even so, merely sending the hsmfPDUSessionUri to the V-SMF in an earlier message (e.g., in PDU_Session_Update Request) is not feasible, because the V-SMF may not support such earlier delivery and/or may be unprepared to accept the information.

Exemplary embodiments of the present disclosure address these and other problems, challenges, and/or issues by providing techniques for updating the V-SMF with the hsmfPDUSessionUri information in a manner that is both timely and under control of the V-SMF, so that the V-SMF is expecting to receive the hsmfPDUSessionUri when it is delivered. These techniques provide various other advantages, including facilitating correct operation of the secondary authentication/authorization by a DN-AAA server during PDU session establishment for home-routed roaming scenarios.

It is noted that the present application defines that the second request comprises one or more indicators of whether the V-SMF supports respective one or more indicators of whether the V-SMF supports respective one or more features related to receiving, from the H-SMF, an identifier of a resource in the H-SMF that is associated with the PDU session. It is noted that the present disclosure may also be enabled even if the above information is not comprised by the second request. It is noted that the V-SMF may also receive the third request comprising the identifier of the resource in the H-SMF, wherein the third request being received before receiving any other messages from the H-SMF, irrespective of whether the one or more indicators are present in the second request.

The present disclosure is directed to a method, performed by a session management function, V-SMF, of a visited public land mobile network, VPLMN, for establishing a user-requested PDU session to be routed through a user's home PLMN, HPLMN, the method comprising:

receiving, for example from an access management function, AMF, in the VPLMN, a first request to establish a home-routed PDU session, wherein the first request identifies an SMF, H-SMF, in the HPLMN; and sending, to the H-SMF, a second request to create the home-routed PDU session, wherein the second request includes an identifier of a resource in the V-SMF that is associated with the PDU session.

The above enables the H-SMF to address the services of the V-SMF related to the PDU session e.g. PDUSession_Update Request from H-SMF to V-SMF.

In an example, the method comprises the step of receiving, from the H-SMF, a third request that includes an identifier of a resource in the H-SMF that is associated with the PDU session and allows the V-SMF to address services of the H-SMF related to the PDU session.

It was the insight of the inventor that the V-SMF is not able to send a PDU session update request to the H-SMF, in the home routed roaming, because the V-SMF does not have the resource URI of the resource in the H-SMF.

The present method enables the V-SMF to contact the H-SMF in these situations as it has received, in the third request, an identifier of the resource in the H-SMF that is associated with the PDU session.

In a further example, the method comprises the step of sending by the V-SMF, to the H-SMF, a fourth request for transferring an authentication response from the UE using the identifier of the resource in the H-SMF that is associated with the PDU session.

In another example, the third request being received before receiving any other messages from the H-SMF.

In a further example, any of:
the first request comprises a PDUSession_CreateSMContext Request;
the second request comprises a PDUSession_Create Request; and
the third request comprises a PDUSession_Update Request.

Following the above, the present disclosure enables the H-SMF to address the services of the V-SMF related to the PDU session, e.g. PDUSession_Update Request from H-SMF to V-SMF.

In context of the present disclosure, the resource in the H-SMF that is associated with the PDU session is, for example, directly related to the Session Management, SM, Context for service operations related with this PDU Session.

In another example, the method further comprises the step of sending, to the H-SMF, a PDUSession_update message for transferring an authentication response from the UE using the identifier of the resource in the H-SMF that is associated with the PDU session.

Examples of the disclosure are presented here below.

In an example, the third request being received before receiving any other messages from the H-SMF.

In a further example, the first request comprises a PDUSession_CreateSMContext Request, the second request comprises a PDUSession_Create Request; and the third request comprises a PDUSession_Update Request.

In another example, the method further comprises the step of sending, to the H-SMF, a PDUSession_update message for transferring an authentication response from the UE using the identifier of the resource in the H-SMF that is associated with the PDU session.

In a second aspect, the present disclosure is directed to a method, performed by a session management function, H-SMF, of a home public land mobile network, HPLMN, for establishing a user-requested Protocol Data Unit, PDU, session to be routed from a user's visited PLMN, VPLMN, through the HPLMN, the method comprising:

receiving, from an SMF of the VPLMN, V-SMF, a second request to create a home-routed PDU session, wherein the second request includes an identifier of a resource in the V-SMF associated with the PDU session, and sending, to the V-SMF, a third request that includes the identifier of a resource in the H-SMF that is associated with the PDU session.

In an example, the third request is sent to said V-SMF before sending any other messages to the V-SMF.

In a further example, the second request comprises a PDUSession_Create Request; and the third request comprises a PDUSession_Update Request.

In an example, the method further comprises the step of receiving, from the V-SMF, a PDUSession_update message for transferring an authentication response from the UE.

In a further aspect of the present disclosure, there is provided a session management, SMF, node arranged to operate in a public land mobile network, PLMN, the session management node comprising:

a network interface configured to communicate with at least one other SMF in at least one other PLMN;

processing circuitry operably coupled to the network interface and configured to perform operations corresponding to any of the methods; and power supply circuitry configured to supply power to the SMF node.

In an example, the session management, SMF, node is arranged to operate in a public land mobile network, PLMN, the SMF node being arranged to perform operations corresponding to any of the methods in accordance with the present disclosure.

In a further aspect, there is provided a non-transitory, computer-readable medium storing computer-executable instructions that, when executed by processing circuitry comprising a session management, SMF, node in a public land mobile network, PLMN, configure the SMF node to perform operations corresponding to any of the methods in accordance with the present disclosure.

In another aspect, there is provided a computer program product comprising computer-executable instructions that, when executed by processing circuitry comprising a session management, SMF, node in a public land mobile network, PLMN, configure the SMF node to perform operations corresponding to any of the methods in accordance with the present disclosure.

In some embodiments, an identifier of a resource to be created in the H-SMF for a PDU session (e.g., hsmfPDUSessionUri) can be included in the PDUSession_Update Request message sent from the H-SMF after receiving the PDUSession_Create Request message from the V-SMF containing an identifier of a resource in the V-SMF for the PDU session (e.g., vsmfPDUSessionUri). This PDUSession_Update Request message corresponds to operation 3b shown in FIG. 8. In addition, however, the PDUSession_Create Request message of these embodiments includes an indicator of whether the V-SMF supports such early delivery of hsmfPDUSessionUri in the PDUSession_Update Request message.

Upon receiving the PDUSession_Create Request message, the H-SMF can determine from the indicator whether the V-SMF supports early deliver of hsmfPDUSessionUri. If it determines that the V-SMF supports early delivery, the H-SMF includes the hsmfPDUSessionUri in the PDUSession_Update Request message. If the indicator is absent or indicates that the V-SMF does not support early delivery, the H-SMF does not include the hsmfPDUSessionUri in the PDUSession_Update Request message. For example, the H-SMF can instead include hsmfPDUSessionUri in the PDUSession_Create Response message, where the V-SMF conventionally expects to receive it.

Figure 10:
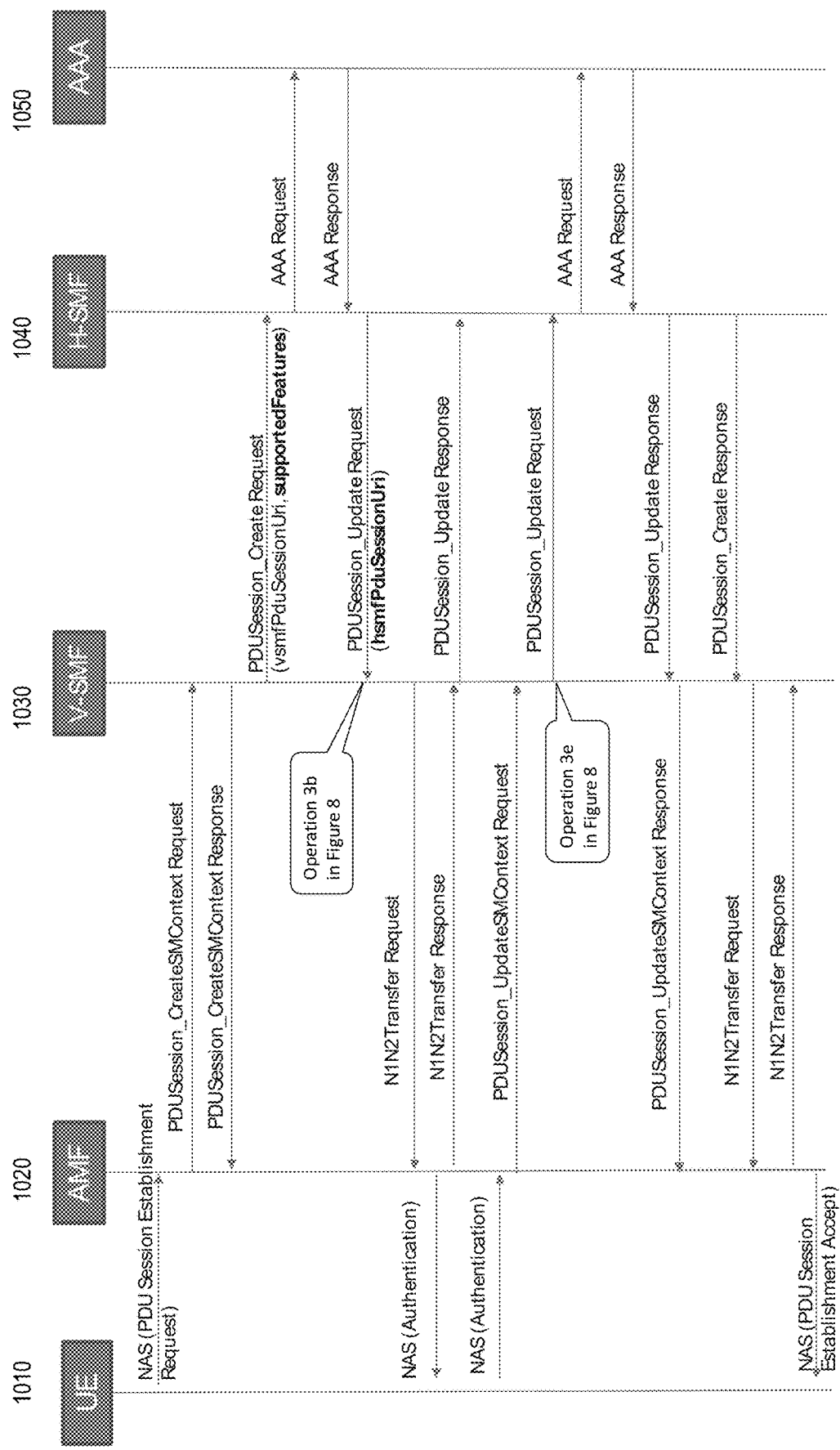
FIGS. 10-11 show two exemplary signalling flows for PDU session establishment in a home-routed roaming scenario, according to various exemplary embodiments of the present disclosure.

FIG. 10 shows an exemplary signalling flow diagram according to these exemplary embodiments. In FIG. 10, the indicator is called "supportedFeatures." For example, the indicator can be a particular sub-field of a "supportedFeatures" field that relates to various features supported by the V-SMF on the interface with the H-SMF.

In other embodiments, before the H-SMF sends a PDUSession_Create Response message including hsmfPDUSessionUri, the H-SMF can send a PDUSession_Update message to the V-SMF to update the resource already being created in V-SMF for the same PDU session (e.g., by addressing vsmfPduSessionUri). In such embodiments, however, the V-SMF should send a PDUSession_Update Response message only after it receives a response from UE that include an authentication response, which is transferred via the PDUSession_Update SmContext Request message sent from the AMF. This is because the V-SMF has to use PDU Session update response message to transfer the PDU Session authentication complete message from UE, since the V-SMF is not able to initiate a PDUSession_Update (to transfer the authentication response) towards the H-SMF before it receives PDUSession_Create response which contains hsmfPDUSessionUri.

In these embodiments, two other indicators can be used in the messages to indicate support for such features. First, the PDUSession_Update Request message sent by the V-SMF can include a first indicator that the V-SMF should delay sending the PDUSession_Update Response message until after receiving the authentication response from the UE via the AMF. Second, the PDUSession_Create Response message sent by the V-SMF can include a second indicator of whether the V-SMF supports: 1) processing a PDU Session Update request from the H-SMF for a PDU session for which the resource has not been fully established in the H-SMF (i.e., H-SMF has not sent PDU Session Create Response with hsmfPDUSessionUri, together with 2) a delayed response under control of the H-SMF via the first indicator. For convenience, these two features will be referred to collectively as "delayed sending" or "delayed response."

Upon receiving the PDUSession_Create Request message, the H-SMF can determine from the second indicator whether the V-SMF supports delayed sending of the PDUSession_Update Response message. If it determines that the V-SMF supports delayed sending, the H-SMF can include the first indicator in the PDUSession_Update Request message. If the second indicator is absent or indicates that the V-SMF does not support delayed sending, the H-SMF does not include the first indicator in the PDUSession_Update Request message.

Upon receiving the PDUSession_Update Request message, the V-SMF can determine whether the first indicator is present and, if so, whether it indicates that the V-SMF should delay sending the PDUSession_Update Response message. If it determines that the H-SMF requests delayed sending, the V-SMF can delay sending the message accordingly. If the first indicator is absent or indicates that the H-SMF does not request delayed sending, the V-SMF can send the message without waiting for the UE response, in the manner expected by the H-SMF.

Figure 11:
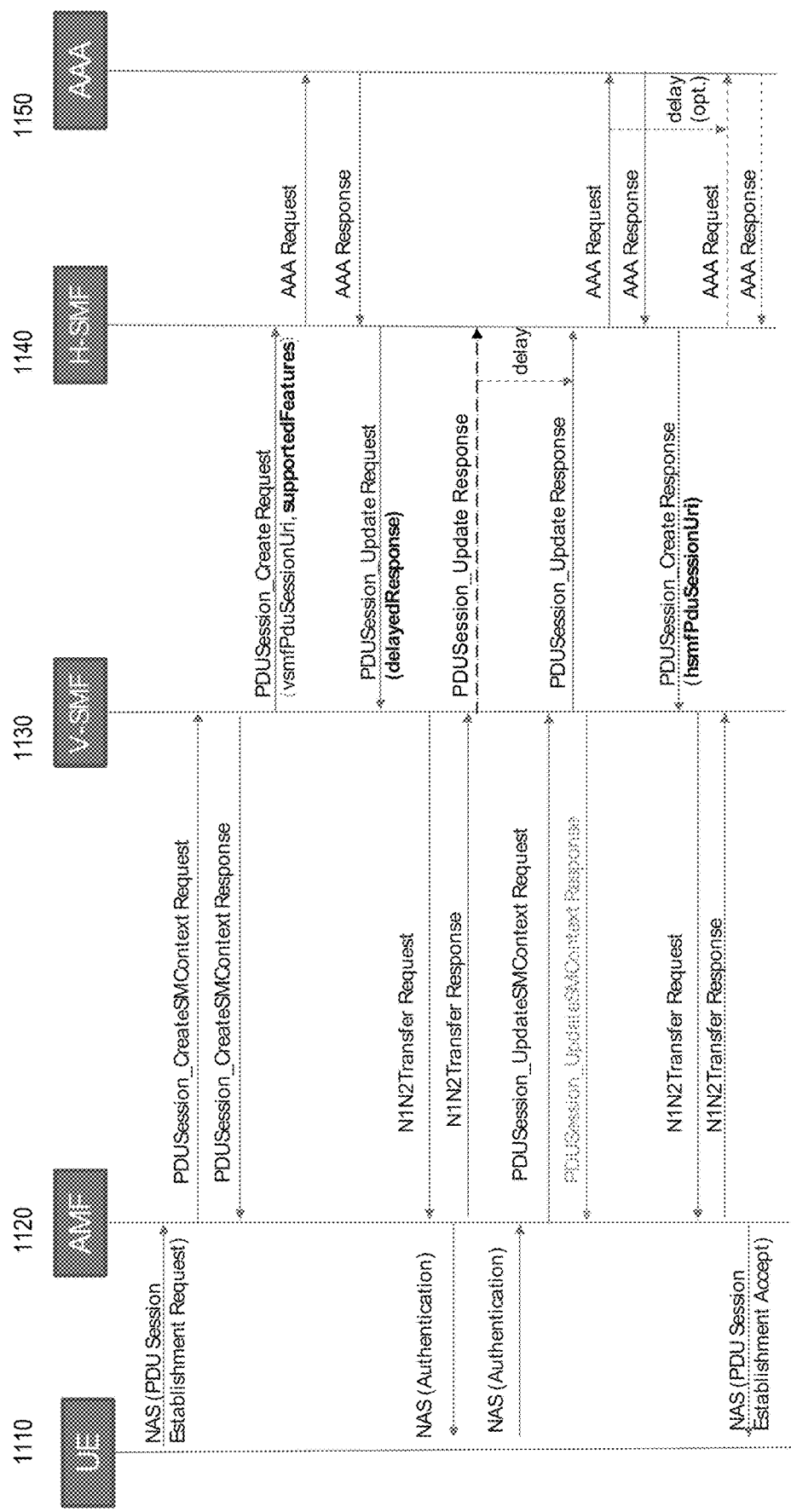

FIG. 11 shows an exemplary signalling flow diagram according to these exemplary embodiments. In FIG. 11, the first indicator is called "delayedResponse" and the second indicator is called "supportedFeatures," similar to FIG. 10. For example, the first indicator can be a particular sub-field of a "supportedFeatures" field that relates to various features supported by the V-SMF on the interface with the H-SMF.

In other exemplary embodiments, the H-SMF can respond to the presence or absence of the "supportedFeatures" indicator in the PDUSession_Create Request message in the manner discussed above with respect to the various embodiments. In some embodiments, the H-SMF can also perform additional actions if the indicator is absent or indicates that neither of the two alternatives (e.g., early deliver or delayed response) are supported by the V-SMF. For example, the H-SMF can defer and/or delay communication towards AAA for the authentication procedure. In other words, the H-SMF can proceed with PDU session creation as if the authentication was successful, and then trigger AAA procedure after the PDU session is created, i.e., after sending PDU Session Create response with acceptance. This is illustrated in FIG. 11 by the optional delay of the AAA Request/Response messages.

Figure 12:
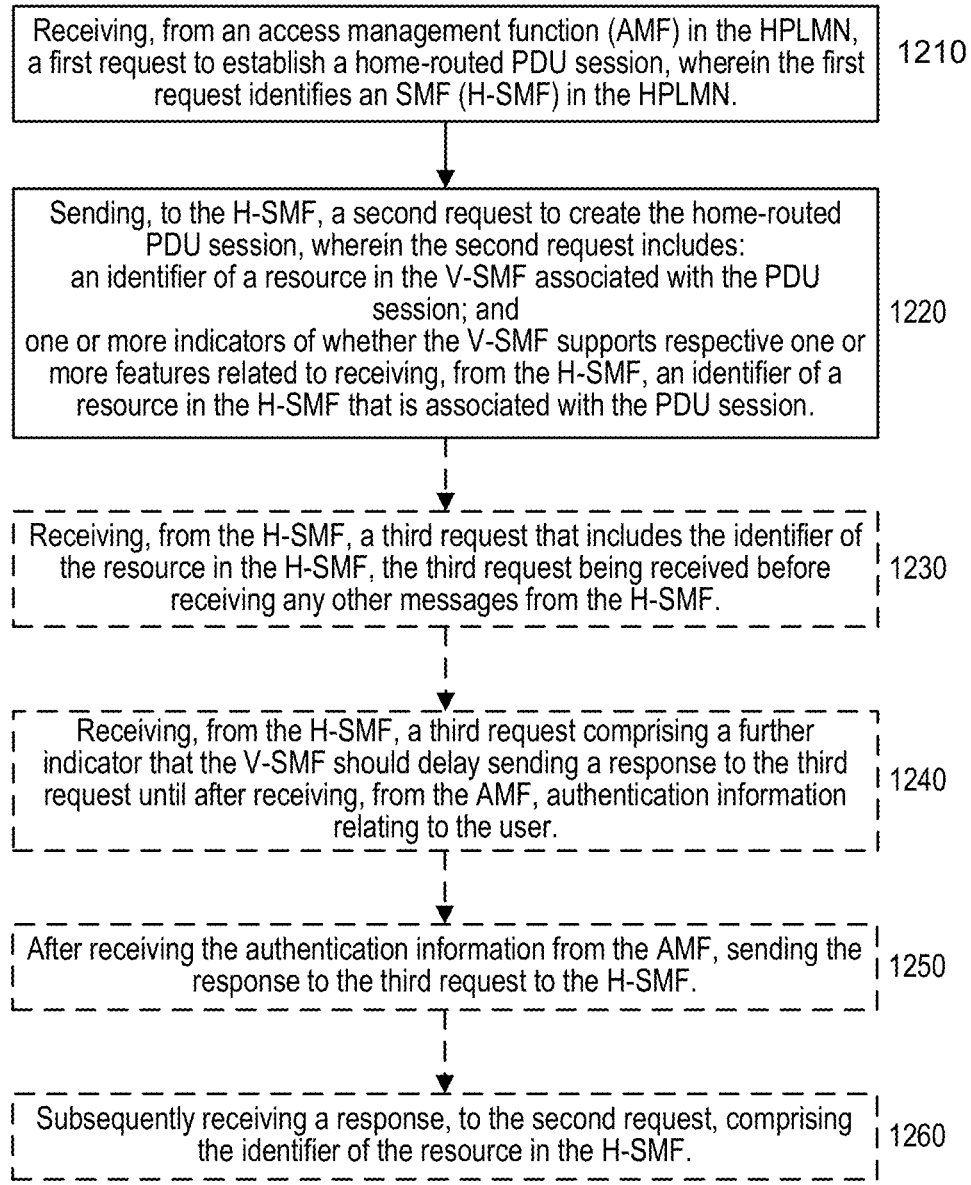
FIGS. 12-13 illustrate exemplary methods and/or procedures for establishing a user-requested PDU session to be routed from a user's visited PLMN (VPLMN) through the user's home PLMN (HPLMN), according to various exemplary embodiments of the present disclosure.

FIG. 12 illustrates an exemplary method and/or procedure for establishing a user-requested PDU session to be routed through the user's HPLMN, according to various exemplary embodiments of the present disclosure. The exemplary method and/or procedure shown in FIG. 12 can be performed by a session management function (e.g., SMF) or node in a visited PLMN that is different that the HPLMN of the user establishing the PDU session. Although the exemplary method and/or procedure is illustrated in FIG. 12 by blocks in a particular order, this order is exemplary and the operations corresponding to the blocks can be performed in different orders, and can be combined and/or divided into blocks and/or operations having different functionality than shown in FIG. 12. Furthermore, the exemplary method and/or procedure shown in FIG. 12 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

The exemplary method and/or procedure can include the operations of block 1210, where the V-SMF can receive, from an access management function (AMF) in the HPLMN, a first request to establish a home-routed PDU session, wherein the first request identifies an SMF (H-SMF) in the HPLMN. The exemplary method and/or procedure can also include the operations of block 1220, where the V-SMF can send, to the H-SMF, a second request to create the home-routed PDU session. The second request can include an identifier of a resource in the V-SMF associated with the PDU session. The second request can also include one or more indicators of whether the V-SMF supports respective one or more features related to receiving, from the H-SMF, an identifier of a resource in the H-SMF that is associated with the PDU session.

In some embodiments, the one or more indicators can include an indicator that the V-SMF supports early delivery of the identifier of the resource in the H-SMF. In such embodiments, the exemplary method and/or procedure can also include the operations of block 1230, where the V-SMF can receive from the H-SMF, a third request that includes the identifier of the resource in the H-SMF, the third request being received before receiving any other messages from the H-SMF.

In some embodiments, the one or more indicators can include an indicator that the V-SMF supports delayed sending of a response to a third request. In such embodiments, the exemplary method and/or procedure can also include the operations of block 1240, where the V-SMF can receive, from the H-SMF, a third request comprising a further indicator that the V-SMF should delay sending a response to the third request until after receiving, from the AMF, authentication information relating to the user. In such embodiments, the exemplary method and/or procedure can also include the operations of block 1250, where the V-SMF can, after receiving the authentication information from the AMF, send the response to the third request to the H-SMF. In such embodiments, the exemplary method and/or procedure can also include the operations of block 1260, where the V-SMF can subsequently receive a response, to the second request, comprising the identifier of the resource in the H-SMF.

In some embodiments, the first request comprises a PDUSession_CreateSMContext Request, the second request comprises a PDUSession_Create Request, and the third request comprises a PDUSession_Update Request.

Figure 13:
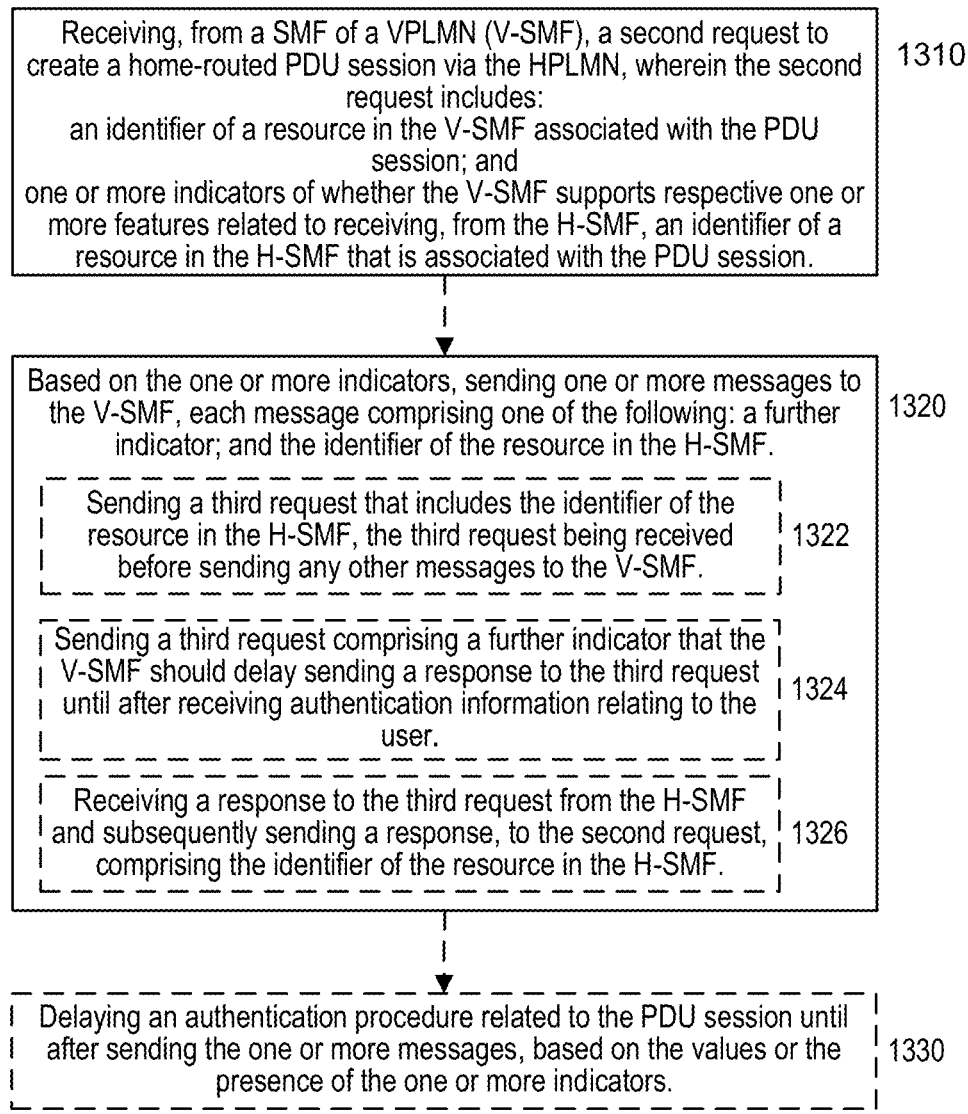

FIG. 13 illustrates an exemplary method and/or procedure for establishing a user-requested PDU session to be routed from a user's VPLMN through the user's HPLMN, according to various exemplary embodiments of the present disclosure. The exemplary method and/or procedure shown in FIG. 13 can be performed by a session management function (e.g., SMF) or node in a HPLMN (e.g., a H-SMF) that is different from the VPLMN where the user is initiating the PDU session. Although the exemplary method and/or procedure is illustrated in FIG. 13 by blocks in a particular order, this order is exemplary and the operations corresponding to the blocks can be performed in different orders, and can be combined and/or divided into blocks having different functionality than shown in FIG. 13. Furthermore, the exemplary method and/or procedure shown in FIG. 13 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

The exemplary method and/or procedure can include the operations of block 1310, where the H-SMF can receive, from the V-SMF, a second request to create a home-routed PDU session. The second request can include an identifier of a resource in the V-SMF that is associated with the PDU session. The second request can also include one or more indicators of whether the V-SMF supports respective one or more features related to receiving, from the H-SMF, an identifier of a resource in the H-SMF that is associated with the PDU session. The exemplary method and/or procedure can also include the operations of block 1320, where the H-SMF can, based on the one or more indicators, send one or more messages to the V-SMF, with each message including one of the following: a further indicator; and the identifier of the resource in the H-SMF.

In some embodiments, the one or more indicators can include an indicator that the V-SMF supports early delivery of the identifier of the resource in the H-SMF. In such embodiments, the operations of block 1320 can include the operations of sub-block 1322, where the H-SMF can send, to the V-SMF, a third request that includes the identifier of the resource in the H-SMF, the third request being sent before sending any other messages to the V-SMF. In other words, the third request can be one of the one or more messages.

In some embodiments, the one or more indicators can include an indicator that the V-SMF supports delayed sending of a response to a third request. In such embodiments, the operations of block 1320 can include the operations of sub-block 1324, where the H-SMF can send, to the V-SMF, a third request comprising a further indicator that the V-SMF should delay sending a response to the third request until after receiving authentication information relating to the user. In other words, the third request can be one of the one or more messages.

In such embodiments, the operations of block 1320 can include the operations of sub-block 1326, where the H-SMF can receive the response to the third request from the V-SMF. In such embodiments, the one or more messages sent to the V-SMF include a response, to the second request, comprising the identifier of the resource in the H-SMF, with the response to the second request being sent after receiving the response to the third request.

In some embodiments, the exemplary method and/or procedure can also include the operations of block 1330, where the H-SMF can delay an authentication procedure related to the PDU session until after sending the one or more messages. In such embodiments, the delaying can be based on the one or more indicators being absent from the second request, or the one or more indicators having values that indicate that the V-SMF does not support the respective one or more features.

In some embodiments, the first request comprises a PDUSession_CreateSMContext Request, the second request comprises a PDUSession_Create Request, and the third request comprises a PDUSession_Update Request.

Figure 14:
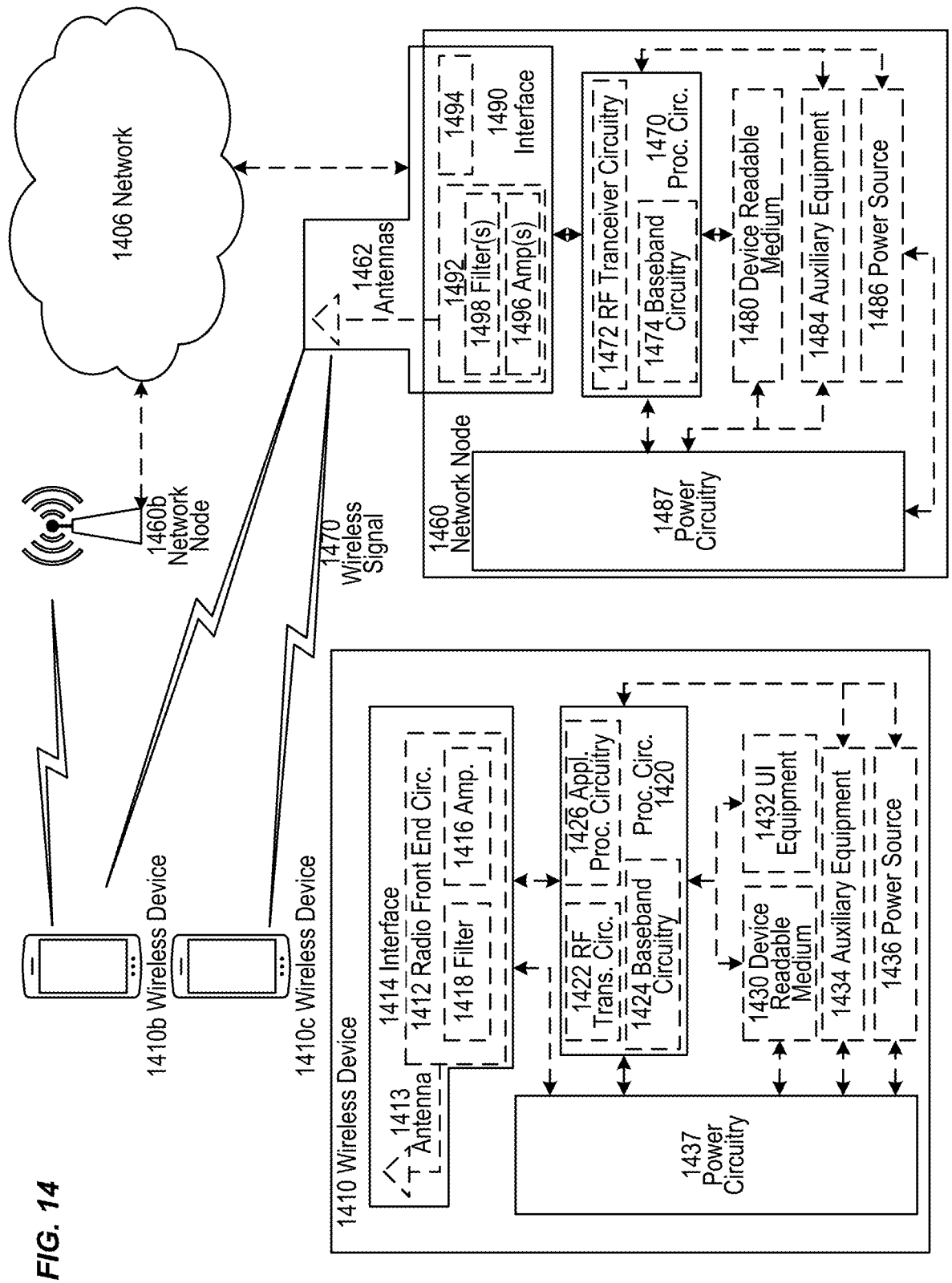
FIG. 14 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (loT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-loT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
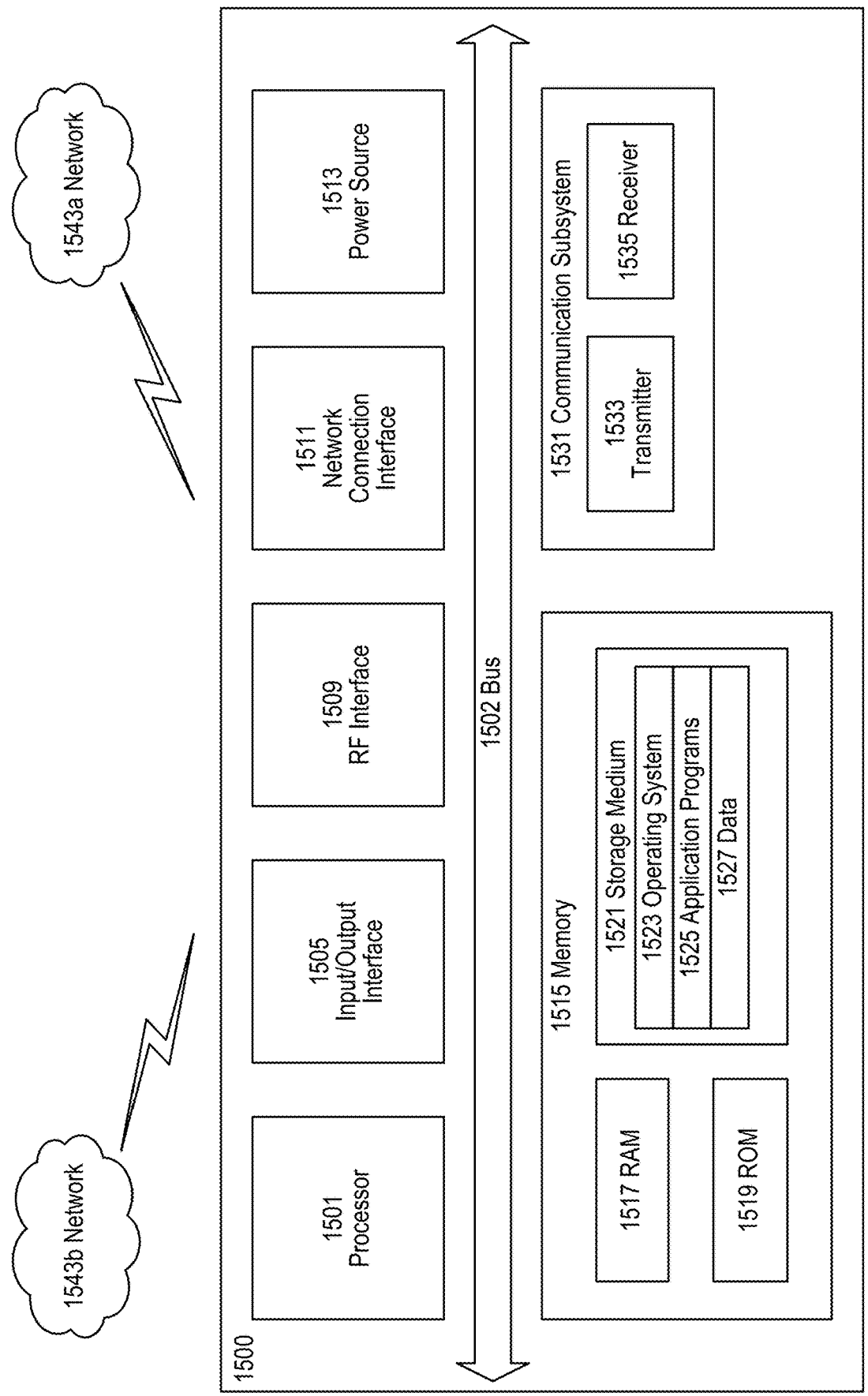
FIG. 15 illustrates an exemplary embodiment of a UE, in accordance with various aspects described herein.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543*b* using communication subsystem 1531. Network 1543*a* and network 1543*b* can be the same network or networks or different network or networks. Communication subsystem 1531 can be configured to include one or more transceivers used to communicate with network 1543*b*. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543*b* can encompass wired and/or wireless networks such as a local-area network (LAN), a wide-area network (WAN), a computer network, a wireless network, a telecommunications network, another like network or any combination thereof. For example, network 1543*b* can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
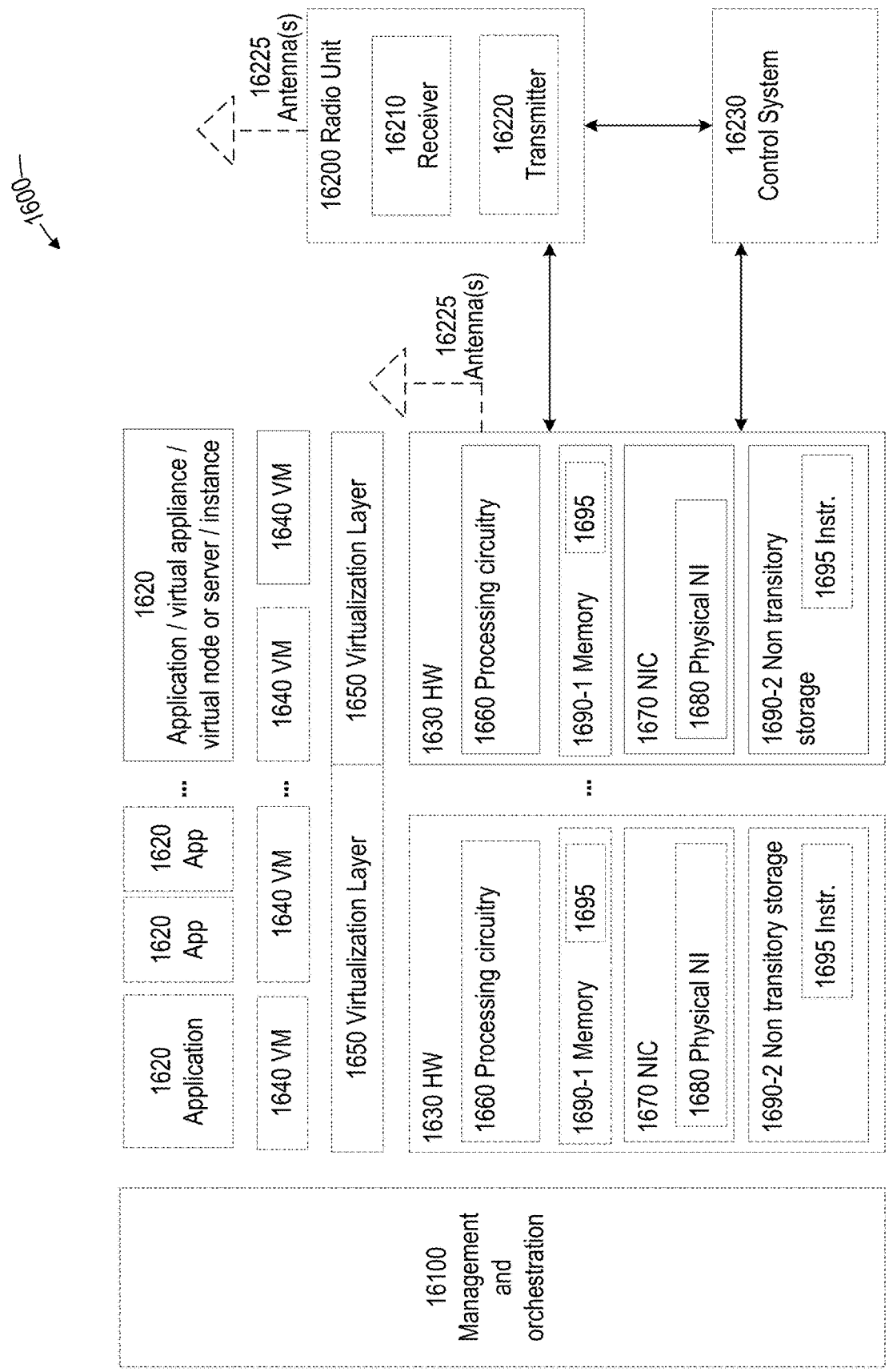
FIG. 16 is a block diagram illustrating an exemplary virtualization environment usable for implementation of various embodiments of network nodes described herein.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 17:
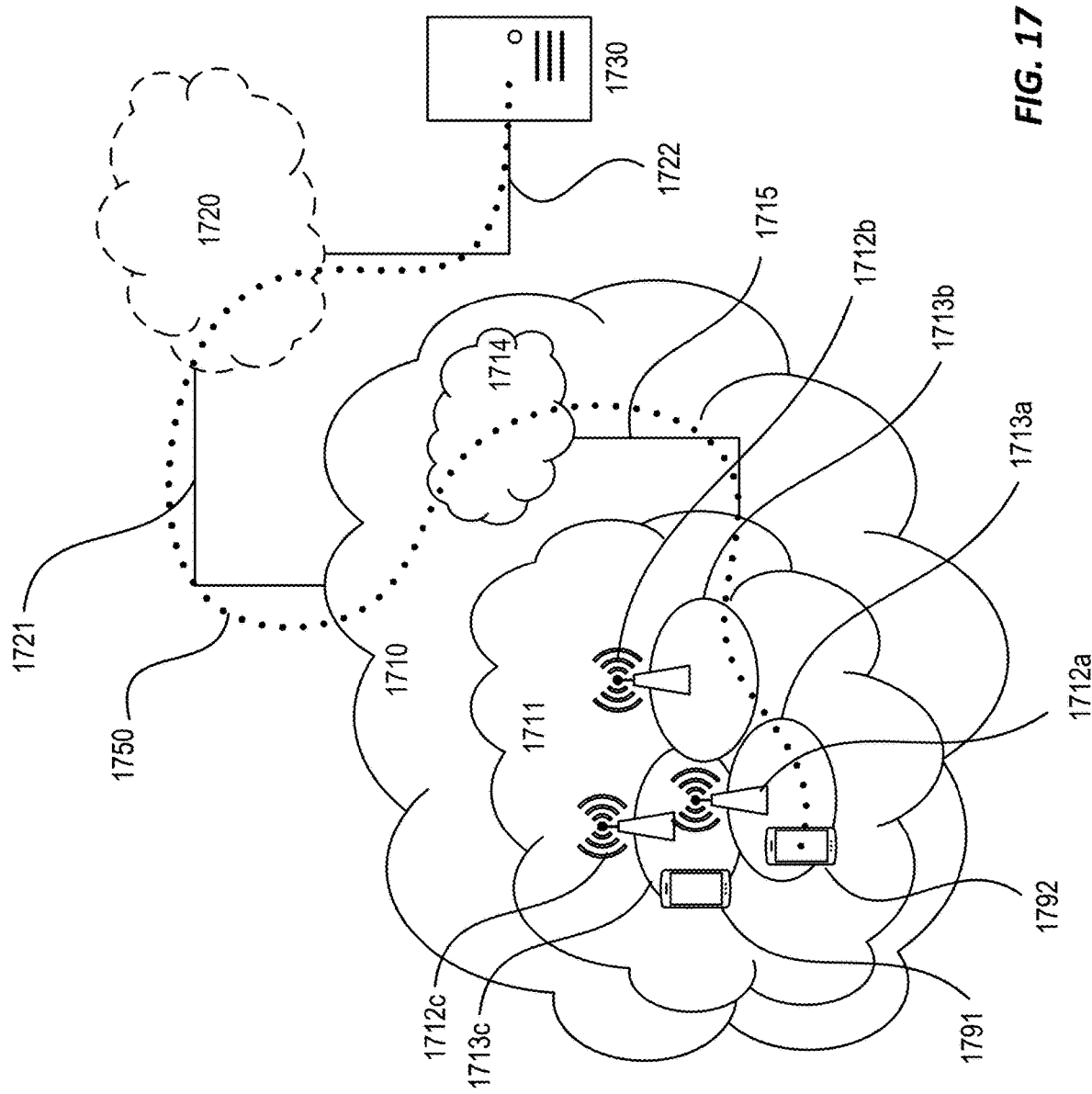
FIGS. 17-18 are block diagrams of various exemplary communication systems and/or networks, in accordance with various aspects described herein.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* can be configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 can also include UE 1830 already referred to. Its hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides.

Figure 18:
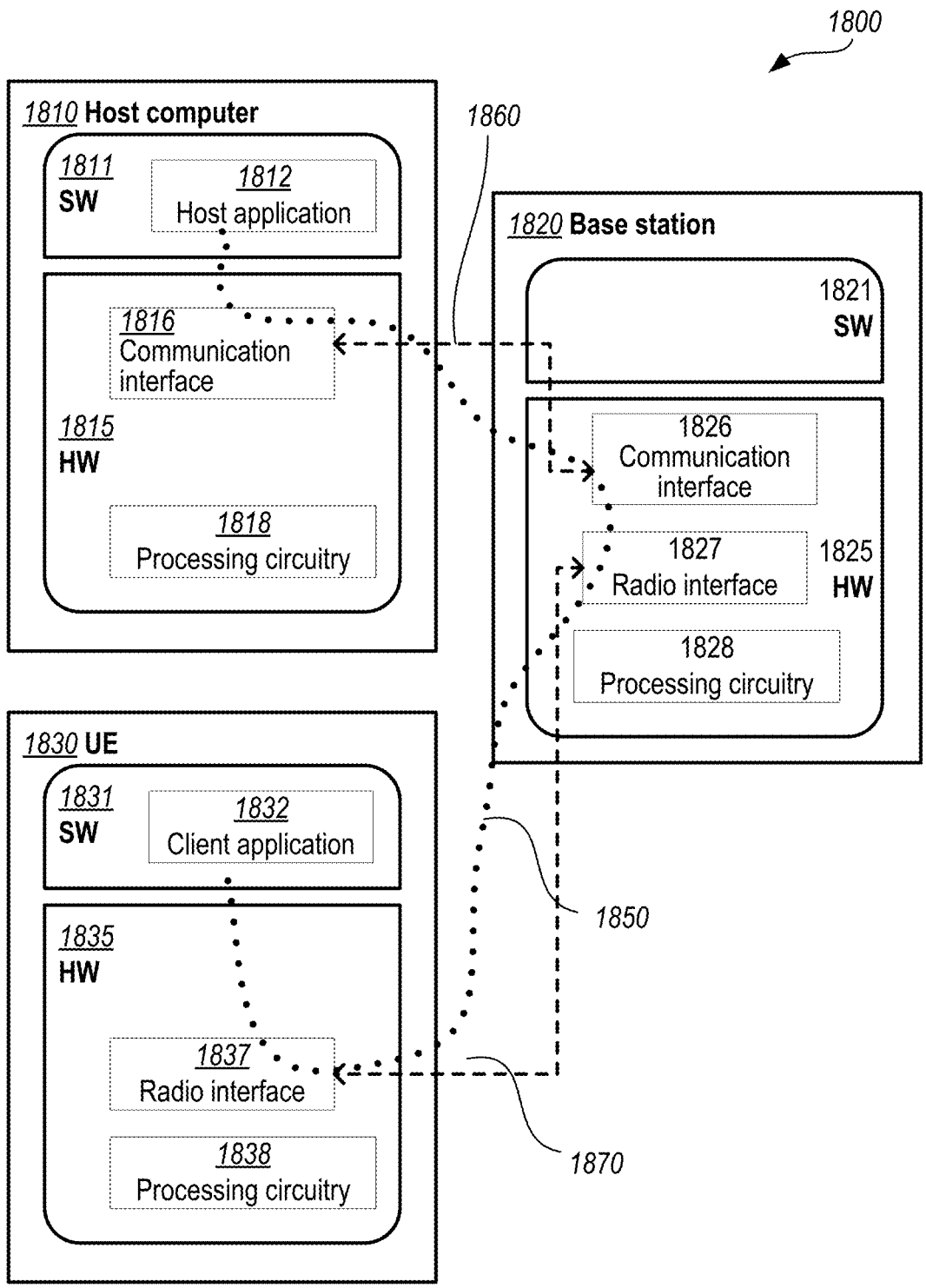

It is noted that host computer 1810, base station 1820 and UE 1830 illustrated in FIG. 18 can be similar or identical to host computer 1730, one of base stations 1712a, 1712b, 1712c and one of UEs 1791, 1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors etc.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to FIGS. 17 and 18. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

FIG. 20 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

Figures 21, 22:
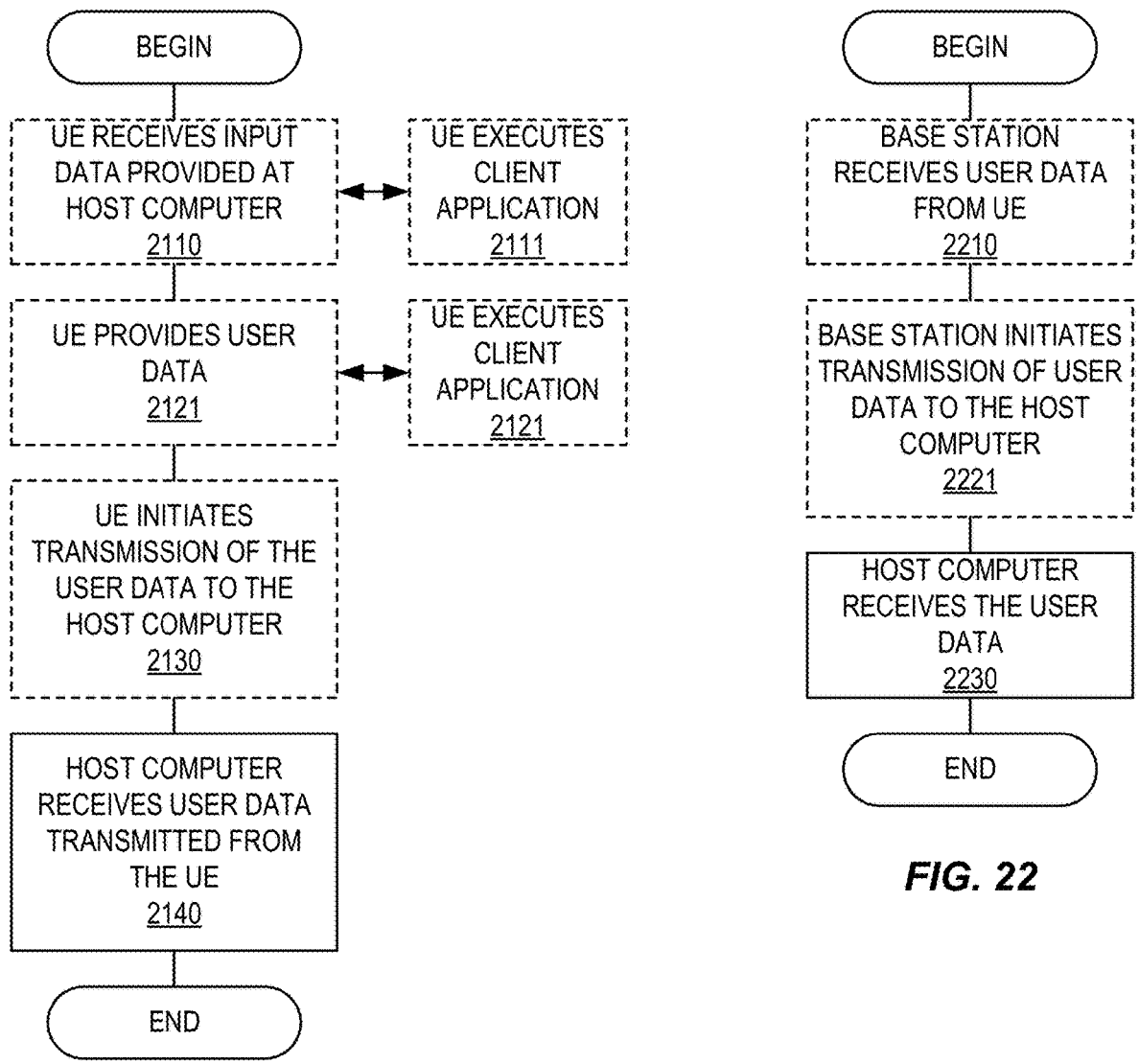

FIG. 21 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 21 will be included in this section. In step 2110 (which can be optional), the UE receives input data provided by the host computer. Additionally or alternatively, in step 2120, the UE provides user data. In substep 2121 (which can be optional) of step 2120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

FIG. 22 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method for establishing a user-requested protocol data unit (PDU) session in a user's visited public land mobile network (VPLMN), the method performed by a session management function (V-SMF) in the VPLMN and comprising:
  receiving, from an access and mobility management function (AMF) in the VPLMN, a PDUSession_CreateSM-Context Request to establish the PDU session to be routed through the user's home PLMN (HPLMN), wherein the PDUSession_CreateSMContext Request identifies a session management function (H-SMF) in the user's HPLMN;
  sending, to the identified H-SMF, a PDUSession_Create Request to create the PDU session, wherein the PDUSession_Create Request includes an identifier of a session management (SM) context, in the V-SMF, that is associated with the PDU session; and
  receiving, from the H-SMF, a PDUSession_Update Request that includes an identifier of an SM context, in the H-SMF, that is associated with the PDU session.

2. The method of claim 1, further comprising using the received identifier of the SM context in the H-SMF, sending to the H-SMF a PDUSession_Update Response for transferring an authentication response from a user equipment (UE) of the user.

3. The method of claim 1, wherein:
  the PDUSession_Create Request includes an indication that the V-SMF supports early delivery of the identifier of the SM context in the H-SMF; and
  the identifier of the SM context in the H-SMF is included in the PDUSession_Update Request based on the indication that the V-SMF supports early delivery of the identifier of the SM context in the H-SMF.

4. The method of claim 3, wherein when the PDUSession_Create Request indicates that the V-SMF does not support early delivery of the identifier of the SM context in the H-SMF:
  the identifier of the SM context in the H-SMF is not received in the PDUSession_Update Request; and
  the method further comprises, after receiving the PDUSession_Update Request, receiving from the H-SMF a PDUSession_Create Response that includes the identifier of the SM context in the H-SMF.

5. The method of claim 1, wherein the PDUSession_Update Request that includes the identifier of the SM context in the H-SMF, is received before receiving any other messages from the H-SMF related to the PDU session.

6. The method of claim 1, wherein the identifier of the SM context in the H-SMF-enables the V-SMF to address services related to the PDU session that are provided by the H-SMF.

7. A method for establishing a user-requested protocol data unit (PDU) session in a user's visited public land mobile network (VPLMN), the method performed by a session management function (H-SMF) in the user's home PLMN (HPLMN) and comprising:
receiving, from a session management function (V-SMF) in the user's VPLMN, a PDUSession_Create Request to create the PDU session to be routed through the user's HPLMN, wherein the PDUSession_Create Request includes an identifier of a session management (SM) context, in the V-SMF, that is associated with the PDU session; and
sending, to the V-SMF, a PDUSession_Update Request that includes an identifier of an SM context, in the H-SMF, that is associated with the PDU session.

8. The method of claim 7, further comprising after sending the identifier of the SM context in the H-SMF, receiving from the V-SMF a PDUSession_Update Response for transferring an authentication response from a user equipment (UE) of the user.

9. The method of claim 7, wherein:
the PDUSession_Create Request includes an indication that the V-SMF supports early delivery of the identifier of the SM context in the H-SMF; and
the identifier of the SM context in the H-SMF is included in the PDUSession_Update Request based on the indication that the V-SMF supports early delivery of the identifier of the SM context in the H-SMF.

10. The method of claim 9, wherein when the PDUSession_Create Request indicates that the V-SMF does not support early delivery of the identifier of the SM context in the H-SMF:
the identifier of the SM context in the H-SMF is not included in the PDUSession_Update Request; and
the method further comprises, after sending the PDUSession_Update Request, sending to the V-SMF a PDUSession_Create Response that includes the identifier of the SM context in the H-SMF.

11. The method of claim 7, wherein the PDUSession_Update Request that includes the identifier of the SM context in the H-SMF, is sent before sending the V-SMF any other messages related to the PDU session.

12. The method of claim 7, wherein the identifier of the SM context in the H-SMF-enables the V-SMF to address services related to the PDU session that are provided by the H-SMF.

13. A session management function (V-SMF) in a user's visited public land mobile network (VPLMN), the V-SMF comprising:
a network interface configured to communicate with other network functions in the VLPMN and in the user's home PLMN (HPLMN); and
processing circuitry operably coupled to the network interface, whereby the processing circuitry and the network interface are configured to:
receive, from an access and mobility management function (AMF) in the VPLMN, a PDUSession_CreateSMContext Request to establish a protocol data unit (PDU) session to be routed through the user's HPLMN, wherein the PDUSession_CreateSMContext Request identifies a session management function (H-SMF) in the user's HPLMN;
send, to the identified H-SMF, a PDUSession_Create Request to create the PDU session, wherein the PDUSession_Create Request includes an identifier of a session management (SM) context, in the V-SMF, that is associated with the PDU session; and
receive, from the H-SMF, a PDUSession_Update Request that includes an identifier of an SM context, in the H-SMF, that is associated with the PDU session.

14. The V-SMF of claim 13, wherein:
the PDUSession_Create Request includes an indication that the V-SMF supports early delivery of the identifier of the SM context in the H-SMF; and
the identifier of the SM context in the H-SMF is included in the PDUSession_Update Request based on the indication that the V-SMF supports early delivery of the identifier of the SM context in the H-SMF.

15. The V-SMF of claim 14, wherein when the PDUSession_Create Request indicates that the V-SMF does not support early delivery of the identifier of the SM context in the H-SMF:
the identifier of the SM context in the H-SMF is not received in the PDUSession_Update Request; and
the processing circuitry and the network interface are further configured to, after receiving the PDUSession_Update Request, receiving from the H-SMF a PDUSession_Create Response that includes the identifier of the SM context in the H-SMF.

16. The V-SMF of claim 13, wherein the PDUSession_Update Request that includes the identifier of the SM context in the H-SMF, is received before receiving any other messages from the H-SMF related to the PDU session.

17. A session management function (H-SMF) in a user's home public land mobile network (HPLMN), the H-SMF comprising:
a network interface configured to communicate other network functions in the HLPMN and in the user's visited PLMN (VPLMN); and
processing circuitry operably coupled to the network interface, whereby the processing circuitry and the network interface are configured to:
receive, from a session management function (V-SMF) in the user's VPLMN, a PDUSession_Create Request to create a protocol data unit (PDU) session to be routed through the user's HPLMN, wherein the PDUSession_Create Request includes an identifier of a session management (SM) context, in the V-SMF, that is associated with the PDU session; and
send, to the V-SMF, a PDUSession_Update Request that includes an identifier of an SM context, in the H-SMF, that is associated with the PDU session.

18. The H-SMF of claim 17, wherein:
the PDUSession_Create Request includes an indication that the V-SMF supports early delivery of the identifier of the SM context in the H-SMF; and
the identifier of the SM context in the H-SMF is included in the PDUSession_Update Request based on the indication that the V-SMF supports early delivery of the identifier of the SM context in the H-SMF.

19. The H-SMF of claim 18, wherein when the PDUSession_Create Request indicates that the V-SMF does not support early delivery of the identifier of the SM context in the H-SMF:

the identifier of the SM context in the H-SMF is not included in the PDUSession_Update Request; and the processing circuitry and the network interface are further configured to, after sending the PDUSession_Update Request, sending to the V-SMF a PDUSession_Create Response that includes the identifier of the SM context in the H-SMF.

20. The H-SMF of claim 17, wherein the PDUSession_Update Request that includes the identifier of the SM context in the H-SMF, is sent before sending the V-SMF any other messages related to the PDU session.

* * * * *

UNITED STATES PATENT AND TRADEMARK OFFICE
CERTIFICATE OF CORRECTION

Page 1 of 4

PATENT NO. : 11,943,842 B2
APPLICATION NO. : 18/072803
DATED : March 26, 2024
INVENTOR(S) : Gan et al.

It is certified that error appears in the above-identified patent and that said Letters Patent is hereby corrected as shown below:

On the Title Page

On Page 2, in Item (56), under "OTHER PUBLICATIONS", in Column 2, Line 41, delete "(Release 15) ," and insert -- (Release 15), --, therefor.

In the Drawings

In Fig. 14, Sheet 13 of 19, for Tag "1472", in Line 1, delete "Tranceiver" and insert -- Transceiver --, therefor.

In Fig. 14, Sheet 13 of 19, for Tag "1474", in Lines 1-2, delete "Baseband Circuitry" and insert -- Baseband Processing Circuitry --, therefor.

In Fig. 14, Sheet 13 of 19, for Tag "1424", in Lines 1-2, delete "Baseband Circuitry" and insert -- Baseband Processing Circuitry --, therefor.

In Fig. 15, Sheet 14 of 19, for Tag "1501", in Line 1, delete "Processor" and insert -- Processing Circuitry --, therefor.

In Fig. 21, Sheet 19 of 19, delete " 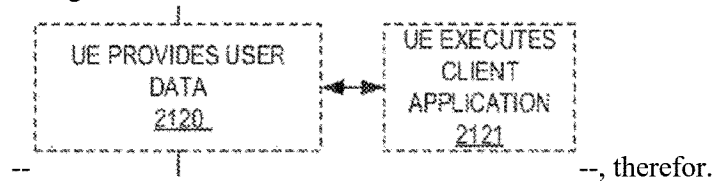 " and insert -- 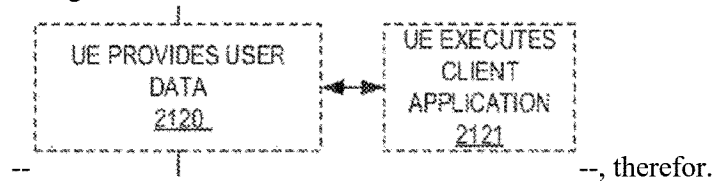 --, therefor.

Signed and Sealed this
Second Day of July, 2024

Katherine Kelly Vidal
*Director of the United States Patent and Trademark Office*

CERTIFICATE OF CORRECTION (continued)
U.S. Pat. No. 11,943,842 B2

In Fig. 22, Sheet 19 of 19, delete Tag "2221" and insert Tag -- 2220 --, therefor.

In the Specification

In Column 1, Line 58, delete "third-("3G")" and insert -- third-generation ("3G") --, therefor.

In Column 2, Line 12, delete "Procotol" and insert -- Protocol --, therefor.

In Column 2, Line 44, delete "is carries" and insert -- carries --, therefor.

In Column 3, Line 16, delete "corresponds a" and insert -- corresponds to a --, therefor.

In Column 4, Line 18, delete "such" and insert -- such as --, therefor.

In Column 6, Line 3, delete "by an" and insert -- by a --, therefor.

In Column 6, Line 48, delete "access management function (AMF)" and insert -- access and mobility management function (AMF) --, therefor.

In Column 7, Line 45, delete "V-SM F." and insert -- V-SMF. --, therefor.

In Column 7, Line 54, delete "receive" and insert -- receiving --, therefor.

In Column 9, Line 26, delete "nod," and insert -- node, --, therefor.

In Column 9, Line 32, delete "reference" and insert -- refer --, therefor.

In Column 9, Line 55, delete "communication (M2M)," and insert -- (M2M) communication, --, therefor.

In Column 9, Line 57, delete "equipped" and insert -- equipment --, therefor.

In Column 10, Line 6, delete "NB-loT, WiFi, BlueTooth," and insert -- NB-IoT, WiFi, Bluetooth, --, therefor.

In Column 11, Lines 49-50, delete "that Request Type indicates" and insert -- the Request Type indicating --, therefor.

In Column 11, Line 67, delete "cause" and insert -- cause. --, therefor.

In Column 12, Line 9, delete "If" and insert -- if --, therefor.

In Column 13, Line 32, delete "needs" and insert -- need --, therefor.

In Column 14, Line 59, delete "operationl8" and insert -- operation 18 --, therefor.

CERTIFICATE OF CORRECTION (continued)
U.S. Pat. No. 11,943,842 B2

In Column 14, Line 62, delete "responsible of" and insert -- responsible for --, therefor.

In Column 15, Line 6, delete "example." and insert -- example, --, therefor.

In Column 16, Line 29, delete "type or" and insert -- type; or --, therefor.

In Column 16, Line 32, delete "5.6.4.3;" and insert -- 5.6.4.3); --, therefor.

In Column 16, Line 35, delete "4.3.4." and insert -- 4.3.4). --, therefor.

In Column 17, Lines 35-36, delete "access management function, AMF," and insert -- access and mobility management function, AMF, --, therefor.

In Column 18, Line 18, delete "PDUSession_update" and insert -- PDUSession_Update --, therefor.

In Column 18, Line 30, delete "PDUSession_update" and insert -- PDUSession_Update --, therefor.

In Column 18, Line 53, delete "PDUSession_update" and insert -- PDUSession_Update --, therefor.

In Column 19, Line 33, delete "deliver" and insert -- delivery --, therefor.

In Column 20, Line 11, delete "hsmfPDUSessionUri," and insert -- hsmfPDUSessionUri), --, therefor.

In Column 20, Line 49, delete "deliver" and insert -- delivery --, therefor.

In Column 20, Line 65, delete "that the" and insert -- than the --, therefor.

In Column 21, Line 14, delete "access management function (AMF)" and insert -- access and mobility management function (AMF) --, therefor.

In Column 23, Line 32, delete "(WiMax)," and insert -- (WiMAX), --, therefor.

In Column 23, Line 32, delete "Zig Bee" and insert -- ZigBee --, therefor.

In Column 25, Line 27, delete "(SOC)." and insert -- (SoC). --, therefor.

In Column 25, Line 37, delete "units" and insert -- units. --, therefor.

In Column 26, Lines 50-51, delete "radio front end circuitry 1490" and insert -- radio front end circuitry 1492 --, therefor.

In Column 27, Line 30, delete "in," and insert -- into, --, therefor.

In Column 28, Line 2, delete "(CPE)." and insert -- (CPE), --, therefor.

In Column 28, Line 10, delete "(loT)" and insert -- (IoT) --, therefor.

CERTIFICATE OF CORRECTION (continued)
U.S. Pat. No. 11,943,842 B2

In Column 28, Line 18, delete "(NB-loT)" and insert -- (NB-IoT) --, therefor.

In Column 28, Line 57, delete "Radio front end circuitry 1414" and insert -- Radio front end circuitry 1412 --, therefor.

In Column 31, Line 40, delete "NB-loT" and insert -- NB-IoT --, therefor.

In Column 31, Line 48, delete "interchangeable." and insert -- interchangeably. --, therefor.

In Column 31, Line 57, delete "power source 1533," and insert -- power source 1513, --, therefor.

In Column 33, Line 28, delete "(SIM/RUIM) module," and insert -- module (SIM/RUIM), --, therefor.

In Column 33, Line 50, delete "WiMax," and insert -- WiMAX, --, therefor.

In Column 38, Line 15, delete "which it" and insert -- which --, therefor.

In Column 39, Line 57, delete "substep 2130" and insert -- step 2130 --, therefor.